United States Patent
Kikuchi et al.

(10) Patent No.: US 11,373,286 B2
(45) Date of Patent: Jun. 28, 2022

(54) STATUS CHECKING DEVICE FOR BUILT-IN OBJECT, OPERATION CHECKING DEVICE AND METHOD FOR CHECKING BUILT-IN OBJECT

(71) Applicant: NABTESCO CORPORATION, Tokyo (JP)

(72) Inventors: Osamu Kikuchi, Kobe (JP); Hiroyuki Inoue, Kobe (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 15/804,377

(22) Filed: Nov. 6, 2017

(65) Prior Publication Data
US 2018/0130198 A1   May 10, 2018

(30) Foreign Application Priority Data
Nov. 7, 2016   (JP) .............................. JP2016-217605

(51) Int. Cl.
*G06T 7/00*   (2017.01)
*G06T 7/90*   (2017.01)
(Continued)

(52) U.S. Cl.
CPC .......... *G06T 7/0004* (2013.01); *B64C 39/024* (2013.01); *G01K 11/12* (2013.01);
(Continued)

(58) Field of Classification Search
CPC .......... G06T 7/0004; G06T 7/90; G06T 7/50; G06T 2207/10048; G06T 2207/30108;
(Continued)

(56) References Cited

U.S. PATENT DOCUMENTS 6,774,806 B1   8/2004   Bannell et al.
8,155,383 B2   4/2012   Bergeron et al.
(Continued)

FOREIGN PATENT DOCUMENTS

DE   102010027072 A1   1/2012
JP   9-244734 A   9/1997
(Continued)

OTHER PUBLICATIONS

Search Report dated Jul. 4, 2018 issued in corresponding German Patent Application No. 10 2017 219 747.1 with English translation.
(Continued)

*Primary Examiner* — Alazar Tilahun
(74) *Attorney, Agent, or Firm* — Pillsbury Winthrop Shaw Pittman, LLP

(57) ABSTRACT

The present invention is provided with an information acquisition unit for acquiring at least one piece of physical information regarding an object including a target built therein, a status of the target being unable to be directly checked from outside, the at least one piece of physical information being manifested outside the object, and a status determination unit for determining the status of the target based on the acquired at least one piece of physical information.

30 Claims, 23 Drawing Sheets

(51) Int. Cl.
  *H04N 5/232*  (2006.01)
  *H04N 5/247*  (2006.01)
  *B64C 39/02*  (2006.01)
  *G01K 11/12*  (2021.01)
  *G06T 7/50*  (2017.01)

(52) U.S. Cl.
  CPC .......... *G06T 7/90* (2017.01); *B64C 2201/127* (2013.01); *G06T 7/50* (2017.01); *H04N 5/23296* (2013.01); *H04N 5/247* (2013.01); *Y02B 10/30* (2013.01)

(58) Field of Classification Search
  CPC . G01K 11/12; B64C 39/024; B64C 2201/127; Y02B 10/30; H04N 5/247; H04N 5/23296; B61L 1/20; G01N 2021/1765; G01N 2033/0085; G01N 21/88; G01N 25/72
  See application file for complete search history.

(56) References Cited

U.S. PATENT DOCUMENTS

| | | | | |
|---|---|---|---|---|
| 8,874,283 | B1* | 10/2014 | Cavote | B64D 47/08 701/11 |
| 9,196,048 | B2 | 11/2015 | Jahanshahi et al. | |
| 2003/0030565 | A1* | 2/2003 | Sakatani | G01P 3/443 340/679 |
| 2008/0065354 | A1 | 3/2008 | Yoshioka et al. | |
| 2008/0141072 | A1* | 6/2008 | Kalgren | G01D 3/08 714/33 |
| 2010/0100275 | A1* | 4/2010 | Mian | G01M 17/013 701/31.4 |
| 2010/0290063 | A1* | 11/2010 | Bakhtiari | G01H 9/00 356/614 |
| 2014/0007657 | A1* | 1/2014 | Matsubara | G01M 13/04 73/53.05 |
| 2015/0302669 | A1 | 10/2015 | Gonnsen et al. | |
| 2017/0066459 | A1* | 3/2017 | Singh | B61L 23/044 |
| 2018/0350053 | A1* | 12/2018 | Sugaya | G06T 7/001 |

FOREIGN PATENT DOCUMENTS

| | | |
|---|---|---|
| JP | 11-166841 A | 6/1999 |
| JP | 2001-282570 A | 10/2001 |
| JP | 2007-050479 A | 3/2007 |
| JP | 2007-256033 A | 4/2007 |
| JP | 2009-050970 A | 3/2009 |
| JP | 2011-242942 A | 12/2011 |
| JP | 2012-223847 A | 11/2012 |

OTHER PUBLICATIONS

International Preliminary Report On Patentability PCT/JP2017/040086 dated May 16, 2019.
Notice of Reasons for Refusal dated Nov. 1, 2019 issued in corresponding Japanese Patent Application No. 2018-549109 with English translation.
Office Action dated Nov. 25, 2020 issued in corresponding Taiwanese Patent Application No. 106138442 with English translation (19 pgs.).
Notice of Reasons for Refusal dated Jan. 29, 2021, issued in corresponding Japanese Patent Application No. 2018-549109 with English translation (10 pgs.).
Taiwanese Office Action dated Jun. 2, 2021, in corresponding Taiwanese Patent Application No. 106138442 with English translation (6 pgs.).
Office Action dated May 6, 2021, issued in corresponding India Application No. 201927017064 (6 pgs.).
Office Action dated Sep. 28, 2021, issued in corresponding Japanese Patent Application No. 2018-549109 with English translation (8 pgs.).
Office Action dated Jun. 11, 2021, issued in corresponding Chinese Patent Application No. 201780066928.1 with English translation (17 pgs.).
Notice of Reasons for Rejection dated Jun. 2, 2020 issued in corresponding Japanese Patent Application No. 2018-549109 with English translation.
Second Office Action dated Jan. 26, 2022 issued in corresponding Chinese Patent Application No. 201780066928.1 with English translation (15 pgs.).
Reconsideration Report by Examiner before Appeal dated Mar. 30, 2022, issued in corresponding Japanese Patent Application No. 2018-549109 with English translation (13 pgs.).

* cited by examiner

STATUS CHECKING DEVICE FOR BUILT-IN OBJECT, OPERATION CHECKING DEVICE AND METHOD FOR CHECKING BUILT-IN OBJECT

CROSS-REFERENCE TO RELATED APPLICATIONS

This application is based upon and claims the benefit of priority from Japanese Patent Application No. 2016-217605, filed on Nov. 7, 2016; the entire contents of which are incorporated herein by reference.

TECHNICAL FIELD

The present invention relates to a status checking device for a built-in object, an operation checking device, and a method for checking a status of a built-in object.

BACKGROUND

Conventionally, there has been proposed a technique in which physical information such as a strain, a temperature, or the like of an apparatus such as a speed reducer or a bearing built in an industrial machine is detected by a sensor provided in said apparatus itself, and a status of the apparatus is monitored based on the thus detected physical information. For example, Japanese Patent Application Publication No. 2007-256033 (the '033 Publication) (detection of deterioration of a lubricant for a bearing used for a mechanical facility: examples of the mechanical facility include a belt conveyor and an axle shaft of a railway vehicle) discloses a system in which a foreign substance content in a lubricant for a bearing built in a mechanical facility is optically detected by a sensor provided in the bearing, and deterioration of the lubricant is detected based on the thus detected foreign substance content in the lubricant.

In inside and outside of an apparatus built in an industrial machine, however, there is often no sufficient space for installing a sensor for monitoring a status of the apparatus. Furthermore, since such a sensor requires a plurality of wirings for transmitting a detection signal and for supplying electric power, in some cases, there is no space for wiring in an industrial machine or wiring might interfere with an operation of an industrial machine and thus cannot be provided. These issues become more conspicuous particularly in a case of monitoring an apparatus built in an industrial machine that has already been in use. Therefore, providing such a status monitoring sensor in an apparatus requires, for example, a size reduction of the sensor, a size increase of an industrial machine so that a sufficient space is allowed in the industrial machine, or adoption of a battery or a wireless type. There are, however, limitations also on a size reduction of a sensor and a size increase of an industrial machine, and use of a battery requires replacement of the battery, while a wireless type presents a problem of antenna setup.

For these reasons, in some cases, it is impossible to monitor or check a status of an apparatus that is built in an industrial machine and cannot be directly accessed from outside.

Furthermore, there is a similar problem with an internal status of a structural member such as a steel frame or a reinforcing steel bar provided in an inside of a civil engineering or building structure such as a wind turbine for wind power generation, a heliostat of a solar thermal power generation tower, an elevated road, a bridge, or a building, a fastening member such as a bolt provided in said inside, various types of piping for water supply and sewage and for electric wiring embedded inside, and concrete forming a civil engineering or building structure made of said concrete, such as a wind turbine for wind power generation, a solar thermal power generation tower, an elevated road, a bridge, or a building.

Moreover, there is a similar problem also with a common groove, a water pipe, a gas pipe or the like buried under a road or a sidewalk, and a connection portion thereof.

There is a similar problem further with, for example, a structure such as a beam provided inside a vehicle body or a door of an automobile, a truck, a bus, a railway vehicle, or a civil engineering and construction machine such as a hydraulic excavator, inside a hull of a ship, or inside a fuselage of an aircraft, and a fastening member such as a bolt or a rivet.

SUMMARY

The present invention has been made in view of the foregoing and one object thereof is to provide a status checking device for a built-in object, an operation checking device, and a method for checking a status of a built-in object, which allow a status of an apparatus built in an industrial machine to be monitored or checked without directly providing a sensor on the apparatus, the status of the apparatus being unable to be directly checked from outside due to lack of means such as a duct that links an inside to an outside of the industrial machine.

The present invention provides a status checking device for a built-in object, which is provided with an information acquisition unit for acquiring at least one piece of physical information regarding an article including a target built therein, a status of the target being unable to be directly checked from outside, the at least one piece of physical information being manifested outside the article, and a status determination unit for determining the status of the target based on the acquired at least one piece of physical information.

In the status checking device according to the present invention, it may also be possible that the information acquisition unit acquires a plurality of pieces of physical information, and the status determination unit determines a status of the target based on the acquired plurality of pieces of physical information.

In the status checking device for a built-in object according to the present invention, it may also be possible that the status determination unit has an abnormality determination unit for determining whether the target is in an abnormal state.

In the status checking device for a built-in object according to the present invention, it may also be possible that the status determination unit has an abnormality determination unit for determining whether the target is in the abnormal state based on at least one of a result of a comparison between the acquired plurality of pieces of physical information and abnormality determination threshold values corresponding respectively to said plurality of pieces of physical information and a result of a comparison between a combination of the acquired plurality of pieces of physical information and a set of abnormality determination threshold values corresponding to said combination of the plurality of pieces of physical information.

In the status checking device for a built-in object according to the present invention, it may also be possible that the status determination unit has a malfunction prediction unit for determining whether the target is in a state where a malfunction is predicted to occur within a predetermined time period.

In the status checking device for a built-in object according to the present invention, it may also be possible that the malfunction prediction unit determines whether the target is in the state where a malfunction is predicted to occur within a predetermined time period based on at least one of a result of a comparison between the acquired plurality of pieces of physical information and malfunction prediction determination threshold values corresponding respectively to said plurality of pieces of physical information and a result of a comparison between a combination of the acquired plurality of pieces of physical information and a combination of malfunction prediction determination threshold values corresponding to said combination of the plurality of pieces of physical information.

In the status checking device for a built-in object according to the present invention, it may also be possible that the status determination unit has a malfunction prediction unit for determining whether the target is in the state where a malfunction is predicted to occur within a predetermined time period based on a status determination model generated from history information of the acquired at least one piece of physical information.

In the status checking device for a built-in object according to the present invention, it may also be possible that the status determination model is composed of two models, the two models being a malfunction state model generated from the history information as obtained when a malfunction has occurred in the target and a normal state model generated from the history information as obtained when a malfunction has not occurred in the target, and when the target is in a state more analogous to the malfunction state model than to the normal state model, it is determined that the target is in the state where a malfunction is predicted to occur within a predetermined time period.

In the status checking device for a built-in object according to the present invention, it may also be possible that the at least one piece of physical information manifested outside the article includes a piece of physical information regarding a surface of the article.

In the status checking device for a built-in object according to the present invention, it may also be possible that the piece of physical information regarding the surface of the article includes at least one of properties of the surface of the article including a temperature, a position, a strain, a displacement, a vibration, a hue, a brightness, a saturation, a moisture content, an oil content, and a reflectance of a sound wave, ultrasound, infrared light, or any other type of light.

In the status checking device for a built-in object according to the present invention, it may also be possible that the at least one piece of physical information manifested outside the article includes at least one of a sound, an odor, ultrasound, an electromagnetic wave, radiation, and an emission, which are detected outside the article.

In the status checking device for a built-in object according to the present invention, it may also be possible that the information acquisition unit acquires the piece of physical information based on a captured image of at least a part of the surface of the article.

In the status checking device for a built-in object according to the present invention, it may also be possible that a thermochromic member whose color changes depending on a temperature is provided on the surface of the article, and the information acquisition unit acquires a temperature of the surface of the article based on a captured image of the thermochromic member.

In the status checking device for a built-in object according to the present invention, it may also be possible that the information acquisition unit has an enlarged image capturing function of capturing an enlarged image of at least a part of the surface of the article.

In the status checking device for a built-in object according to the present invention, there may be further provided a drive unit for driving the information acquisition unit to change an image capturing range.

In the status checking device for a built-in object according to the present invention, it may also be possible that the information acquisition unit has a plurality of cameras for capturing images of different areas on the surface of the object.

In the status checking device for a built-in object according to the present invention, it may also be possible that the plurality of cameras are disposed so as to surround the article.

In the status checking device for a built-in object according to the present invention, it may also be possible that the information acquisition unit has an optical system capable of wide-angle or omnidirectional image capturing.

In the status checking device for a built-in object according to the present invention, it may also be possible that the information acquisition unit has a drone equipped with a camera and a drone control unit for capturing an image of the surface of the article with the camera.

In the status checking device for a built-in object according to the present invention, it may also be possible that the information acquisition unit acquires a three-dimensional shape of at least a part of the surface of the article based on the captured image, and acquires the piece of physical information based on the acquired three-dimensional shape.

In the status checking device for a built-in object according to the present invention, it may also be possible that the information acquisition unit is disposed away from the surface of the article and disposed at least above the article.

In the status checking device for a built-in object according to the present invention, it may also be possible that, by using a status of the article at a time of construction or installation as a criterion, the status determination unit for a built-in object determines whether or not the target is in an abnormal state or a state where a malfunction is predicted to occur within a predetermined time period.

In the status checking device for a built-in object according to the present invention, it may also be possible that the object is to be operated, and by using a status of the article at a start of the operation as a criterion, it is determined whether or not the target is in an abnormal state or a state where a malfunction is predicted to occur within a predetermined time period.

In the status checking device for a built-in object according to the present invention, it may also be possible that in a case where a first piece of physical information agrees with a second piece of physical information, the first piece of physical information being acquired previously as a piece of physical information obtained when the target is in an abnormal state or a state where a malfunction is predicted to occur within a predetermined time period, the second piece of physical information being acquired at any time by the information acquisition unit, the status determination unit determines that the target is in the abnormal state or the state where a malfunction is predicted to occur within a predetermined time period.

In the status checking device for a built-in object according to the present invention, it may also be possible that the article is an industrial robot having at least one rotation shaft, the target is a speed reducer built in the rotation shaft, and the information acquisition unit acquires physical information regarding a surface of the rotation shaft.

The present invention provides an operation checking device, which checks, in a virtual space on a computer, an operation of an article including a target built therein, a status of the target being unable to be directly checked from outside. In the operation checking device, a status of the target acquired by the above-described status checking device for a built-in object is inputted as information related to a status of the article.

The present invention provides a method for checking a status of a built-in object, which includes steps of acquiring at least one piece of physical information regarding an article including a target built therein, a status of the target being unable to be directly checked from outside, the at least one piece of physical information being manifested outside the article, and determining whether or not the target is in an abnormal state or a state where a malfunction is predicted to occur within a predetermined time period based on the acquire at least one piece of physical information.

According to the present invention, it is possible to check a status of a target built in an object, which is unable to be directly checked from outside, without directly providing a sensor in the target.

DESCRIPTION OF THE PREFERRED EMBODIMENTS

Figure 1:
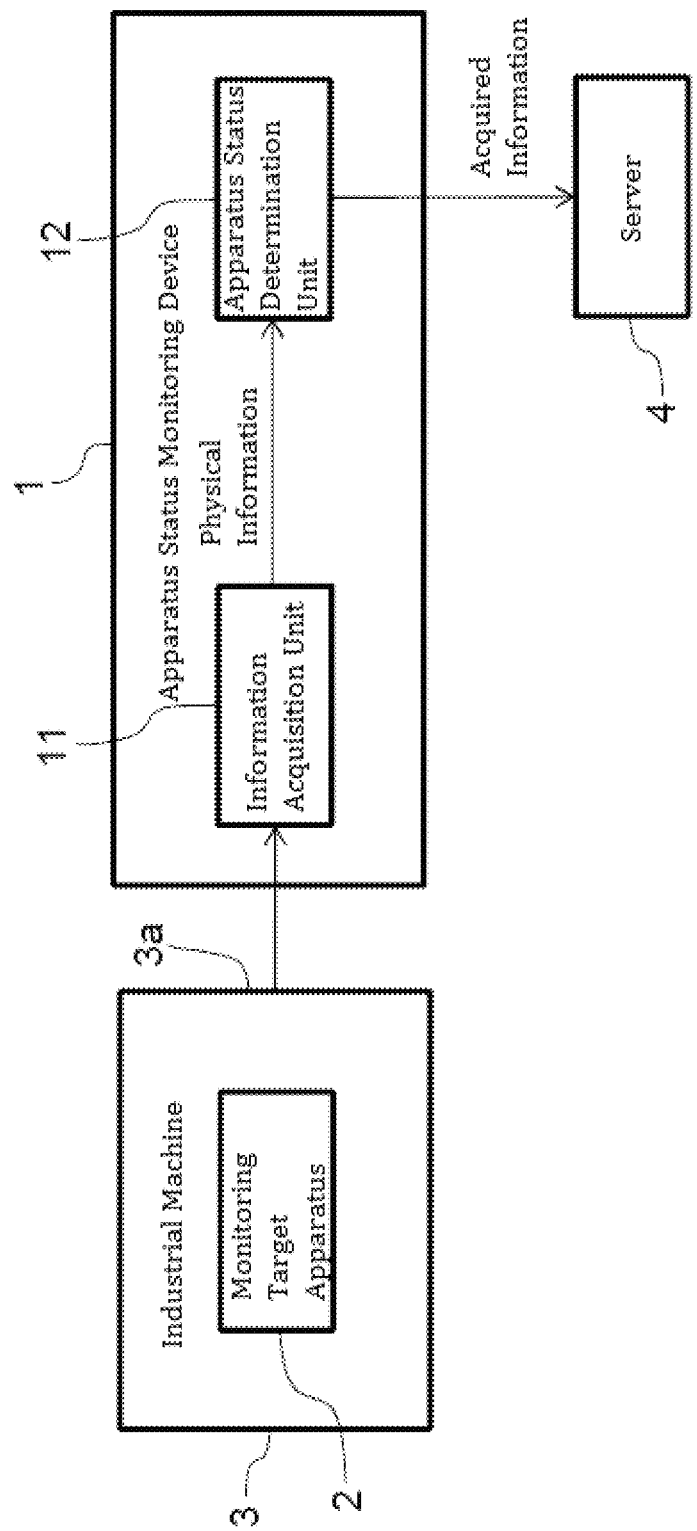
FIG. 1 is a block diagram showing an apparatus status monitoring device according to an embodiment of the present invention.

With reference to the appended drawings, the following describes in detail an apparatus status monitoring device as one example of a status checking device for a built-in object according to an embodiment of the present invention. Embodiments described below are each one example of an embodiment of the present invention, and the present invention is not intended to be construed as being limited thereto. Furthermore, in the drawings referred to in this embodiment, the same parts or parts having similar functions are denoted by the same or like reference characters, and duplicate descriptions thereof are omitted. Furthermore, for the sake of convenience of description, a dimensional ratio of the drawings is possibly different from an actual dimensional ratio, and some elements of a configuration are possibly omitted from the drawings.

FIG. 1 is a block diagram showing an apparatus status monitoring device 1 according to this embodiment. The apparatus status monitoring device 1 according to an example shown in FIG. 1 is characterized in that, independently of an industrial machine 3 as one example of an object according to the embodiment of the present invention, the apparatus status monitoring device 1 is capable of monitoring, outside the industrial machine 3, an operation status of a monitoring target apparatus 2 built in the industrial machine 3, which is unable to be directly checked from outside. Herein, the monitoring target apparatus 2 is one example of a target according to the embodiment of the present invention. As shown in FIG. 1, the apparatus status monitoring device 1 is provided with an information acquisition unit 11 and an apparatus status determination unit 12.

(Information Acquisition Unit 11) The information acquisition unit 11 acquires physical information manifested outside the industrial machine 3 including the monitoring target apparatus 2 built therein.

A state of including the monitoring target apparatus 2 built therein refers to both of a case where the monitoring target apparatus 2 is completely housed inside the industrial machine 3 and thus a status of the monitoring target apparatus 2 is unable to be directly checked from outside and a case where, although a part of the monitoring target apparatus 2 is exposed to outside of the industrial machine 3, a status of the monitoring target apparatus 2 is unable to be directly checked from outside.

Figure 2:
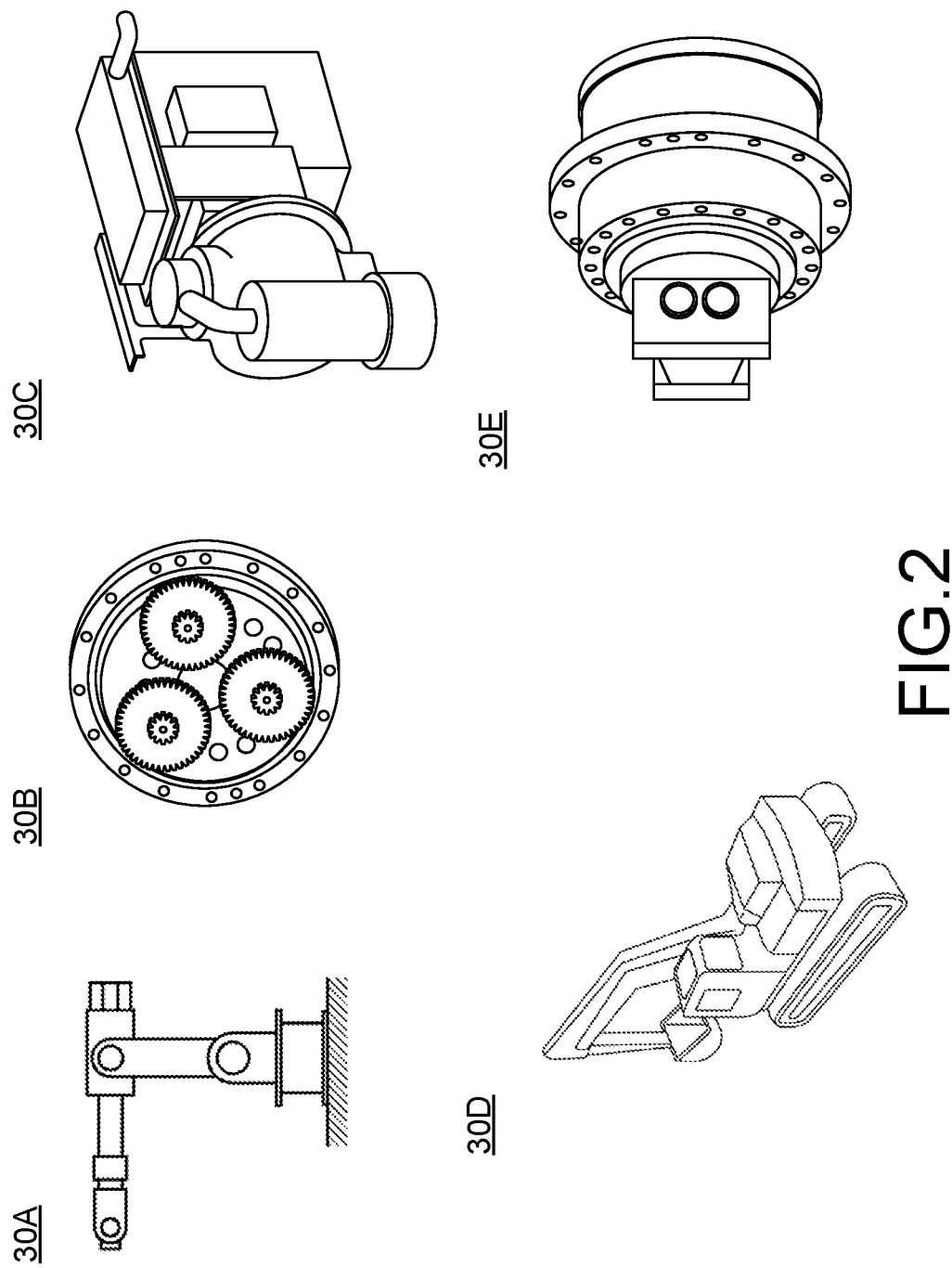
FIG. 2 is a view showing a group of examples of an industrial machine to which the apparatus status monitoring device according to this embodiment is applicable.

FIG. 2 is a view showing a group of examples of the industrial machine 3 to which the apparatus status monitoring device 1 according to this embodiment is applicable. There is no particular limitation on the industrial machine 3 as long as it is a machine used for activities related to industry, i.e. providing products and services. For example, as shown in FIG. 2, the industrial machine 3 may be an industrial robot 30A used for automobile production, a speed reducer 30B built in the industrial robot 30A, a compressor 30C used in an electric train, a construction machine 30D, a travel motor 30E for a construction machine, or the like.

Figure 3:
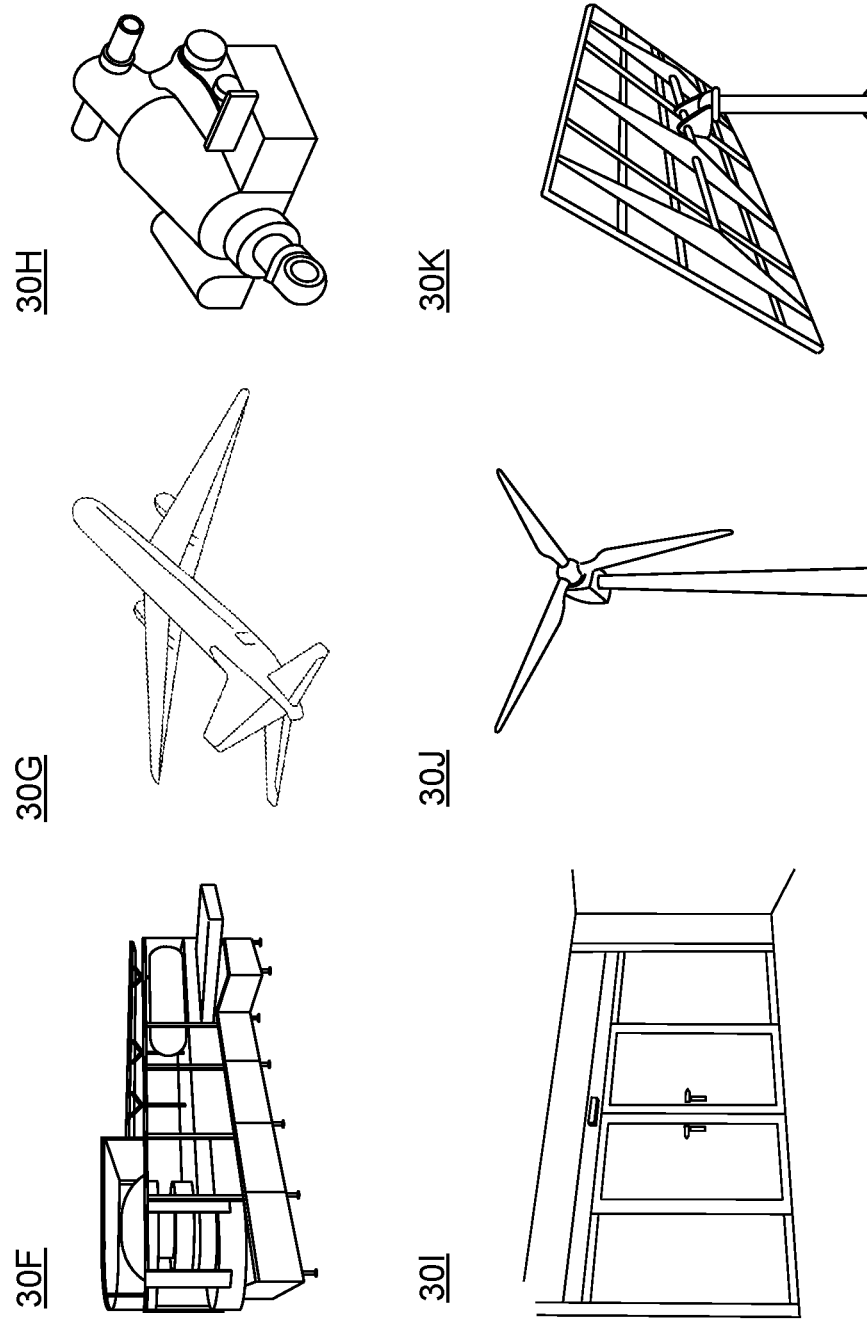
FIG. 3 is a view showing another group of examples of the industrial machine to which the apparatus status monitoring device according to this embodiment is applicable.

FIG. 3 is a view showing another group of examples of the industrial machine 3 to which the apparatus status monitoring device 1 according to this embodiment is applicable. Other than the group of examples shown in FIG. 2, for example, as shown in FIG. 3, the industrial machine 3 may be a filling and packaging machine 30F used for food packaging or the like, an aircraft 30G, a flight control actuator 30H that actuates a movable wing of an aircraft, an automatic door 30I, a speed reducer or a bearing built in a wind turbine 30J for wind power generation, a speed reducer or a bearing built in a heliostat 30K for solar thermal power generation.

There is no particular limitation on the monitoring target apparatus 2 as long as it is an apparatus built in the industrial machine 3. The monitoring target apparatus 2 built in the industrial robot 30A may be, for example, the speed reducer 30B, a bearing, or a motor. The monitoring target apparatus 2 built in the speed reducer 30B may be, for example, a gear, a bearing, or a seal member for lubricant sealing. The monitoring target apparatus 2 built in the compressor 30C may be, for example, an air compression mechanism referred to as an air end. The monitoring target apparatus 2 built in a construction machine may be, for example, the travel motor 30E for a construction machine. The monitoring target apparatus 2 built in the travel motor 30E for a construction machine may be, for example, a planetary gear. The monitoring target apparatus 2 built in the filling and packaging machine 30F may be, for example, a link apparatus. The monitoring target apparatus 2 built in an aircraft may be, for example, the flight control actuator 30H. The monitoring target apparatus 2 built in the flight control actuator 30H may be, for example, a valve. The monitoring target apparatus 2 built in the automatic door 30I may be, for example, an electric motor. The monitoring target apparatus 2 built in the wind turbine 30J for wind power generation may be, for example, a speed reducer, a speed increaser, a bearing, or a motor. The monitoring target apparatus 2 built in the heliostat 30K for solar thermal power generation may be, for example, a speed reducer, a bearing, or a motor.

The physical information regarding the industrial machine 3 manifested outside the industrial machine 3 is, for example, physical information regarding a surface 3a of the industrial machine 3. The physical information regarding the industrial machine 3 refers to information acquirable as a quantified value from the industrial machine 3. The surface 3a of the industrial machine 3 refers to a portion of the industrial machine 3, which is accessible in a contact or non-contact manner from outside of the industrial machine 3. In a case where the surface 3a is transparent, the surface 3a may include a transparent portion and a portion at a back thereof. Furthermore, the surface 3a may include, in addition to the surface 3a of the industrial machine 3 itself, a surface of a substance provided on the surface 3a of the industrial machine 3 for the purpose of acquiring physical information, by, for example, processing the surface 3a, being applied to the surface 3a, or being attached to the surface 3a.

The physical information regarding the surface 3a of the industrial machine 3 may be, for example, a temperature, a position, a strain, a displacement, a vibration, a reflectance of a sound wave, ultrasound, infrared light, or any other type of light, an electromagnetic wave absorption rate, a hue, a brightness, a saturation, a moisture amount, or an oil amount. The physical information manifested outside the industrial machine 3 is not limited to physical information regarding the surface 3a of the industrial machine 3. For example, the physical information manifested outside the industrial machine 3 may be a sound or an odor emitted from the industrial machine 3 and detected outside the industrial machine 3. Moreover, the physical information may be, for example, an intensity of radiation such as X-rays, an electromagnetic wave, ultrasound or the like transmitted or propagated in the industrial machine 3 and detected outside the industrial machine 3, or an emission such as an exhaust gas emitted by the industrial machine 3 and detected outside the industrial machine 3.

The information acquisition unit 11 may be a contact-type information acquisition unit 11 that acquires physical information while being in contact with the surface 3a or a non-contact-type information acquisition unit 11 that acquires physical information while not being in contact with the surface 3a. According to the non-contact-type information acquisition unit 11, since it does not come in contact with the industrial machine 3, a status of the monitoring target apparatus 2 can be detected without exerting an adverse effect on an operation of the industrial machine 3.

The contact-type information acquisition unit 11 may be, for example, a thermometer that measures a temperature, a potentiometer that measures a position or a displacement, a strain gauge that measures a strain, a vibrometer that measures a vibration, a moisture sensor that measures a moisture amount, or an oil sensor that measures an oil amount.

The non-contact-type information acquisition unit 11 may be provided with, for example, a radiation thermometer for measuring a temperature, a laser-type or an eddy current-type distance/displacement sensor for measuring a position or a displacement, a laser Doppler-type non-contact vibrometer for measuring a vibration, a sound wave or ultrasound detector (including those disposed in two dimensions) that outputs a sound wave or ultrasound and receives a reflected wave thereof, a camera for measuring a reflectance of infrared light or any other type of light, a hue, a brightness, or a saturation, a sensor using a microwave or an image to measure a moisture amount, a sensor using a laser to measure an oil amount, a microphone that measures a sound, a radiation measuring instrument that measures radiation, an electromagnetic wave measuring instrument that measures an electromagnetic wave, an ultrasound measuring instrument that measures ultrasound, or a gas measuring instrument that measures a gas such as an exhaust gas or a hazardous gas.

The non-contact-type information acquisition unit 11 may be provided with a camera for acquiring physical information based on a captured image of at least a part of the surface 3a of the industrial machine 3. Physical information is acquired based on an image captured by the camera, and thus physical information can be acquired using a simple configuration without exerting an adverse effect on an operation of the industrial machine 3.

The camera may have an enlarged image capturing function of capturing an enlarged image of at least a part of the surface 3a of the industrial machine 3, namely, a zoom function. An enlarged image of the surface 3a is captured, and thus a particular piece of physical information regarding the surface 3a can be acquired at a high resolution.

The camera may have an optical system capable of wide-angle or omnidirectional image capturing, such as a fish-eye lens. The camera has such an optical system having a wide angle of view, and thus blind spots of the camera on the surface 3a of the industrial machine 3 can be reduced.

A plurality of such cameras may be provided so that images of different areas on the surface 3a of the industrial machine 3 can be captured. The plurality of cameras are provided, and thus blind spots of the cameras on the surface 3a of the industrial machine 3 can be further reduced.

The camera may be a color CCD or a CMOS camera that captures an image of a hue, a brightness, or a saturation of a pressure-sensitive coating material whose color changes depending on a pressure or a temperature-sensitive coating material that is one example of a thermochromic member whose color changes depending on a temperature. Such a CCD or a CMOS camera and a pressure-sensitive coating material or a temperature-sensitive coating material are used, and thus physical information regarding the surface 3a of the industrial machine 3 can be acquired with accuracy, while an adverse effect on the industrial machine 3 is suppressed.

The camera may be a CCD or a CMOS camera (having sensitivity in a visible light region regardless of whether it is of a color-type or a monochrome-type or having sensitivity in an infrared region) that acquires a hue, a brightness, a saturation, or a light reflectance of the surface 3a of the industrial machine 3. An amount of moisture or oil adhering to the surface 3a of the industrial machine 3 can be acquired based on a hue, a brightness, a saturation, or a light reflectance, and thus physical information regarding the surface 3a of the industrial machine 3 can be acquired with accuracy, while an adverse effect on the industrial machine 3 is suppressed.

The camera may be a TOF (time-of-flight) camera. The TOF camera is a distance image sensing camera that can irradiate a subject with pulsed near infrared light, receive reflected light of the near infrared light from the subject with a TOF sensor, and measure a distance to the subject based on a required reflection time of the thus received reflected light. According to the TOF camera, a distance to the surface 3a of the industrial machine 3, namely, depth information can be acquired, and thus a displacement of the industrial machine 3 can be measured without using a device that projects a particular pattern. Moreover, it is also possible to acquire a vibration as a temporal change in displacement, and to measure a strain as a temporal change rate in displacement (a differentiation value of a displacement). Through the use of the TOF camera, a three-dimensional shape of the surface 3a can be easily acquired with high accuracy.

The non-contact-type information acquisition unit 11 may be composed of a projector that projects a random pattern, a gird pattern, a dot pattern or the like on the surface 3a of the industrial machine 3, a camera that captures an image of any of these patterns, and a calculator that calculates a strain of the surface 3a from the thus captured image. In this case, the calculator may calculate a strain based on a degree of temporal deformation of a pattern whose image has been captured. The calculator may acquire a three dimensional shape of at least a part of the surface 3a of the industrial machine 3 based on a captured image of a pattern and acquire a strain based on a degree of temporal deformation of the thus acquired three dimensional shape. With a three dimensional shape used as a basis, accuracy in measuring a strain can be improved.

The non-contact-type information acquisition unit 11 may be provided with a radar that acquires an electromagnetic wave absorption rate.

By measuring a radio wave absorption rate and a change therein, a displacement of the surface 3a of the industrial machine 3 can be measured. Moreover, it is also possible to acquire a vibration as a temporal change in displacement, and to measure a strain as a temporal change rate in displacement (a differentiation value of a displacement).

The non-contact-type information acquisition unit 11 may be provided with a microphone that acquires a sound. A plurality of such microphones may be disposed on at least one of a lateral side and an upper side of the industrial machine 3 so as to face the industrial machine 3 in a state where the plurality of microphones are spread in a plane shape or a curved surface shape. The plurality of microphones are disposed, and thus sounds at different areas on the surface 3a of the industrial machine 3 can be acquired with accuracy.

The non-contact-type information acquisition unit 11 may be provided with an odor sensor that acquires an odor. There is no particular limitation on specific aspects of the odor sensor. For example, the odor sensor may be a semiconductor-type odor sensor that detects an amount of odor molecules absorbed to a surface of a semiconductor as an amount of change in resistance value of the semiconductor. Furthermore, the odor sensor may be a quartz crystal resonator-type odor sensor that has a sensitive film attached to a surface of a resonator and detects an amount of odor molecules absorbed to the sensitive film as an amount of decrease in resonance frequency of the resonator due to an increase in mass of the sensitive film.

The non-contact-type information acquisition unit 11 may be provided with a radiation detector that detects, with a sensor, radiation such as X-rays transmitted through the industrial machine 3 and calculates an absorption rate of X-rays absorbed by the industrial machine 3 based on an amount of the radiation such as X-rays thus detected, or an ultrasound detector that detects, with a sensor, ultrasound transmitted through the industrial machine 3 and calculates an absorption rate of ultrasound absorbed by the industrial machine 3 based on an amount of the ultrasound thus detected.

Figure 4:
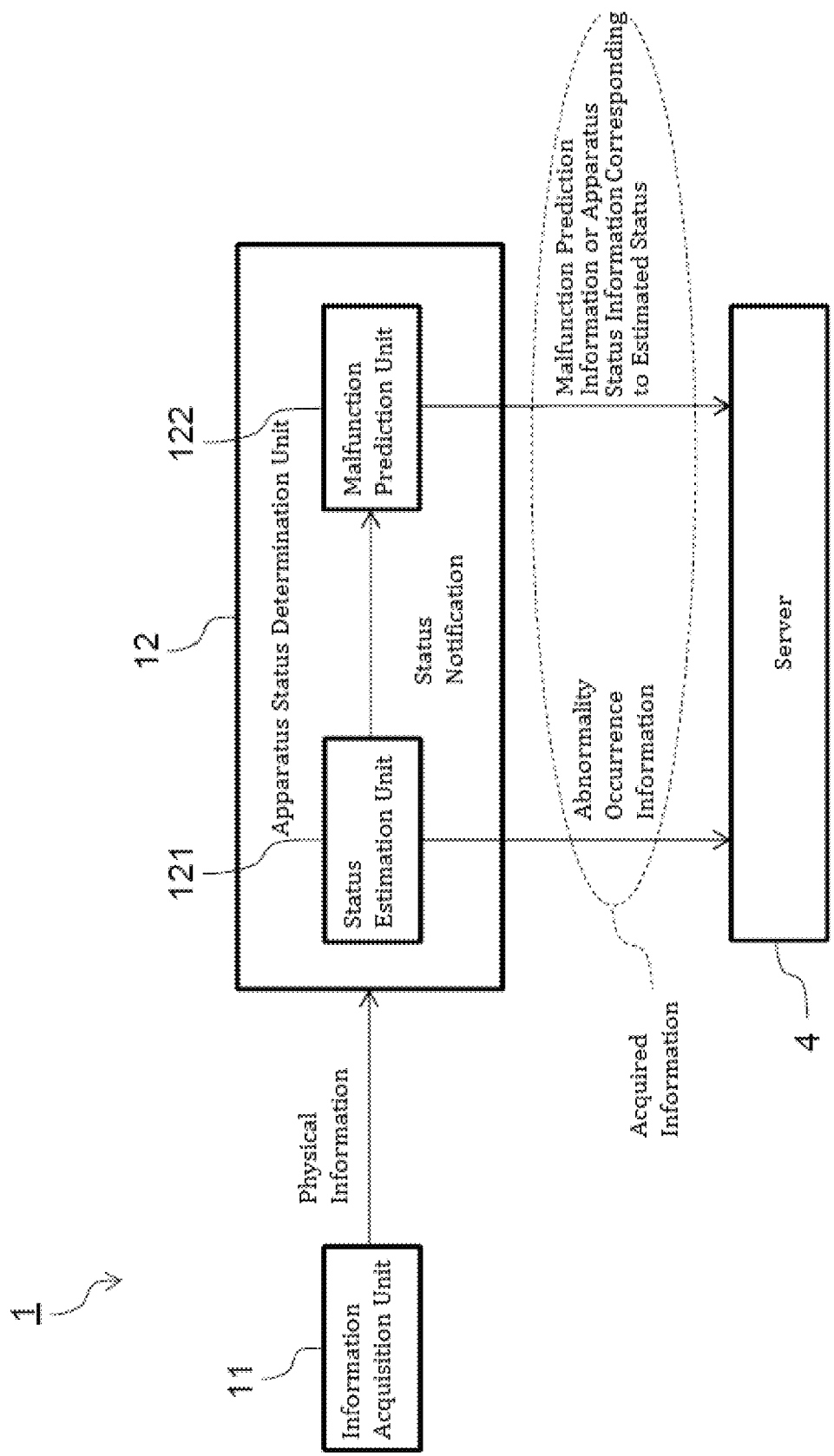
FIG. 4 is a block diagram showing a detail of an apparatus status determination unit in the apparatus status monitoring device according to this embodiment.

(Apparatus Status Determination Unit 12) FIG. 4 is a block diagram showing a detail of the apparatus status determination unit 12 in the apparatus status monitoring device 1 according to this embodiment, as one example of the status determination unit according to the embodiment of the present invention. As shown in FIG. 4, the apparatus status determination unit 12 has a status estimation unit 121 and a malfunction prediction unit 122.

The status estimation unit 121 estimates a status of the monitoring target apparatus 2 based on physical information acquired by the information acquisition unit 11. Moreover, the status estimation unit 121 determines whether the thus estimated status of the monitoring target apparatus 2 is a predetermined state, for example, an abnormal state. That is, the status estimation unit 121 functions as an abnormality determination unit and determines whether the predetermined state is the abnormal state based on acquired physical information. When it is determined that the estimated status is the abnormal state, the status estimation unit 121 outputs, by wire or wirelessly, abnormality occurrence information that gives notification of the abnormal state of the monitoring target apparatus 2 to a server 4 external to the apparatus status monitoring device 1. Moreover, the status estimation unit 121 transmits the status of the monitoring target apparatus 2 to the malfunction prediction unit 122.

The malfunction prediction unit 122 determines whether the estimated status of the monitoring target apparatus 2 is a state where a malfunction is predicted to occur within a predetermined time period. When it is determined that the estimated status is the state where a malfunction is predicted to occur within a predetermined time period, the malfunction prediction unit 122 outputs, by wire or wirelessly, malfunction prediction information that gives notification of the predicted malfunction to the server 4. When no determination is made on whether the estimated status is the abnormal state or the state where a malfunction is predicted to occur within a predetermine time period, the malfunction prediction unit 122 outputs apparatus status information that indicates the estimated status of the monitoring target apparatus 2 to the server 4.

Hereinafter, information acquired by the apparatus status determination unit 12, such as abnormality occurrence information, malfunction prediction information, and apparatus status information, is referred to also as acquired information by the apparatus status determination unit 12.

The abnormal state or the state where a malfunction is predicted to occur within a predetermined time period of the monitoring target apparatus 2 is not particularly limited as long as they are statuses of the monitoring target apparatus 2 that can be estimated based on physical information regarding the industrial machine 3 manifested outside the industrial machine 3. For example, the abnormal state or the state where a malfunction is predicted to occur within a predetermined time period may be a state where a temperature of the monitoring target apparatus 2 is equal to or higher than a preset temperature. Furthermore, the abnormal state or the state where a malfunction is predicted to occur within a predetermined time period may be a state where the monitoring target apparatus 2 has, in a particular portion thereof, a strain, a displacement, or a change in shape equal to or larger than a preset level of strain, displacement, or change in shape. Furthermore, the abnormal state or the state where a malfunction is predicted to occur within a predetermined time period may be a state where the monitoring target apparatus 2 has, in a particular portion thereof, an amplitude or a cycle of a vibration equal to or larger than a preset value of amplitude or cycle. Furthermore, the abnormal state or the state where a malfunction is predicted to occur within a predetermined time period may be a state where the monitoring target apparatus 2 has, in a particular portion thereof, an acceleration or a jerk (an acceleration change rate per unit time) equal to or larger than or equal to or smaller than a preset value of acceleration or jerk. Furthermore, in a case where the information acquisition unit 11 acquires a plurality of pieces of physical information, the abnormal state or the state where a malfunction is predicted to occur within a predetermined time period may be a state where at least two of a temperature, a strain, a displacement, a vibration, an acceleration, and a jerk of the monitoring target apparatus 2 have a preset predetermined relationship. Furthermore, the abnormal state or the state where a malfunction is predicted to occur within a predetermined time period may be a state where a physical status of a preset plurality of portions of the monitoring target apparatus 2 agrees with a preset state. In these examples of the abnormal state or the state where a malfunction is predicted to occur within a predetermined time period, the term "preset" may signify a fixed state or a state of being variable, based on a predetermined relationship, depending on, for example, a change in operation time or installation environment of the industrial machine 3. As previously mentioned, by the status estimation unit 121, these examples of the abnormal state are determined to be a malfunctioning state of the monitoring target apparatus 2. Furthermore, by the malfunction prediction unit 122, these examples of the state where a malfunction is predicted to occur within a predetermined time period are determined as a malfunction prediction that predicts occurrence of a predetermined malfunction within a predetermined time period.

The abnormal state or the state where a malfunction is predicted to occur within a predetermined time period may be affected by a relationship between a position on the surface 3a at which physical information is manifested and a position of the monitoring target apparatus 2. For example, even when pieces of physical information having equal values are acquired, a result of a determination on whether the monitoring target apparatus 2 is in the abnormal state or the state where a malfunction is predicted to occur within a predetermined time period may vary depending on a distance between a position on the surface 3a at which each of the pieces of physical information is acquired and a position of the monitoring target apparatus 2. Similarly, a result of a determination on whether the monitoring target apparatus 2 is in the abnormal state or the state where a malfunction is predicted to occur within a predetermined time period may vary depending on an external factor of the surface 3a regarding which physical information is acquired and the monitoring target apparatus 2. The external factor refers to a temporary or continual disturbance factor with respect to physical information to be acquired, such as an optical disturbance including sunlight, a radio wave state, a sound state, or a wind.

The apparatus status determination unit 12 is, for example, a piece of hardware such as an arithmetic processing unit or a storage device. At least a part of the apparatus status determination unit 12 may be a piece of software. The apparatus status determination unit 12 may be mounted in one apparatus status monitoring device 1 or provided on a system (for example, a server or a database on a cloud) in which any constituent part thereof (for example, the malfunction prediction unit 122) is communicable with the apparatus status monitoring device 1 through a network.

The server 4 may notify a user of acquired information by the apparatus status determination unit 12 inputted from the apparatus status determination unit 12 by, for example, displaying it on a display.

Figure 5:
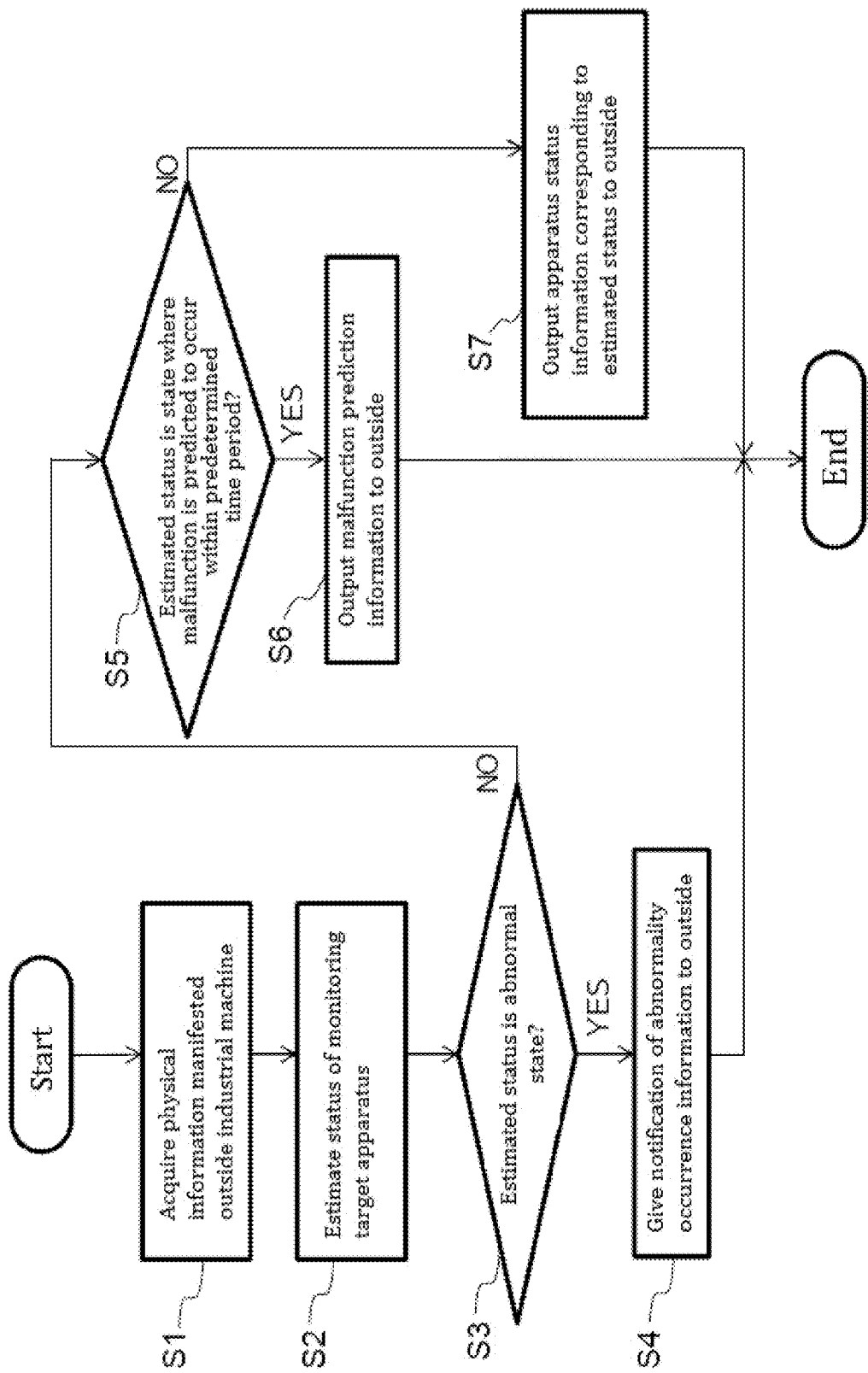
FIG. 5 is a flow chart showing an operation example of the apparatus status monitoring device according to this embodiment.

(Operation Example) Next, a description is given of an operation example of the apparatus status monitoring device 1. FIG. 5 is a flow chart showing an operation example of the apparatus status monitoring device 1 according to this embodiment. A procedure shown in this flow chart is repeatedly implemented as required.

First, as shown in FIG. 5, the information acquisition unit 11 acquires physical information manifested outside the industrial machine 3 (step S1).

After the physical information has been acquired, the status estimation unit 121 estimates a status of the monitoring target apparatus 2 based on the thus acquired physical information (step S2).

Next, the status estimation unit 121 determines whether the thus estimated status of the monitoring target apparatus 2 is the abnormal state (step S3).

In a case where the estimated status of the monitoring target apparatus 2 is the abnormal state (YES at step S3), the status estimation unit 121 outputs abnormality occurrence information to outside (step S4).

On the other hand, in a case where the estimated status of the monitoring target apparatus 2 is not the abnormal state (NO at step S3), the malfunction prediction unit 122 determines whether the estimated status of the monitoring target apparatus 2 is the state where a malfunction is predicted to occur within a predetermined time period (step S5).

In a case where the estimated status of the monitoring target apparatus 2 is the state where a malfunction is predicted to occur within a predetermined time period (YES at step S5), the malfunction prediction unit 122 outputs malfunction prediction information to outside (step S6). On the other hand, in a case where the estimated status of the monitoring target apparatus 2 is not the state where a malfunction is predicted to occur within a predetermined time period (NO at step S5), the malfunction prediction unit 122 outputs a piece of apparatus status information corresponding to the estimated status of the monitoring target apparatus 2 to outside (step S7).

When an attempt is made to provide a sensor and wiring for directly detecting a status of the monitoring target apparatus 2 in a limited space inside the industrial machine 3, due to restrictions on a size, a shape, a power feeding method, a data transmission scheme, and an amount of wiring of the sensor, the sensor and wiring could hardly be provided.

As a solution to this, according to the apparatus status monitoring device 1 of this embodiment, a piece of physical information regarding the surface 3a of the industrial machine 3 is acquired, and based on a correspondence relationship between the thus acquired piece of physical information and a status of the monitoring target apparatus 2 built in the industrial machine 3, which is set so as to correspond to the thus acquired piece of physical information, a status of the monitoring target apparatus 2 built in the industrial machine 3 can be estimated. The correspondence relationship may be set based on actual measurement or set based on a physical calculation model. By this configuration, without the need to provide a dedicated sensor and wiring for directly detecting a status of the monitoring target apparatus 2 inside the industrial machine 3, a status of the monitoring target apparatus 2 can be detected.

Thus, according to this embodiment, without directly providing a sensor in the monitoring target apparatus 2 built in the industrial machine 3, a status of the monitoring target apparatus 2 can be monitored.

First Modification Example

Figure 6:
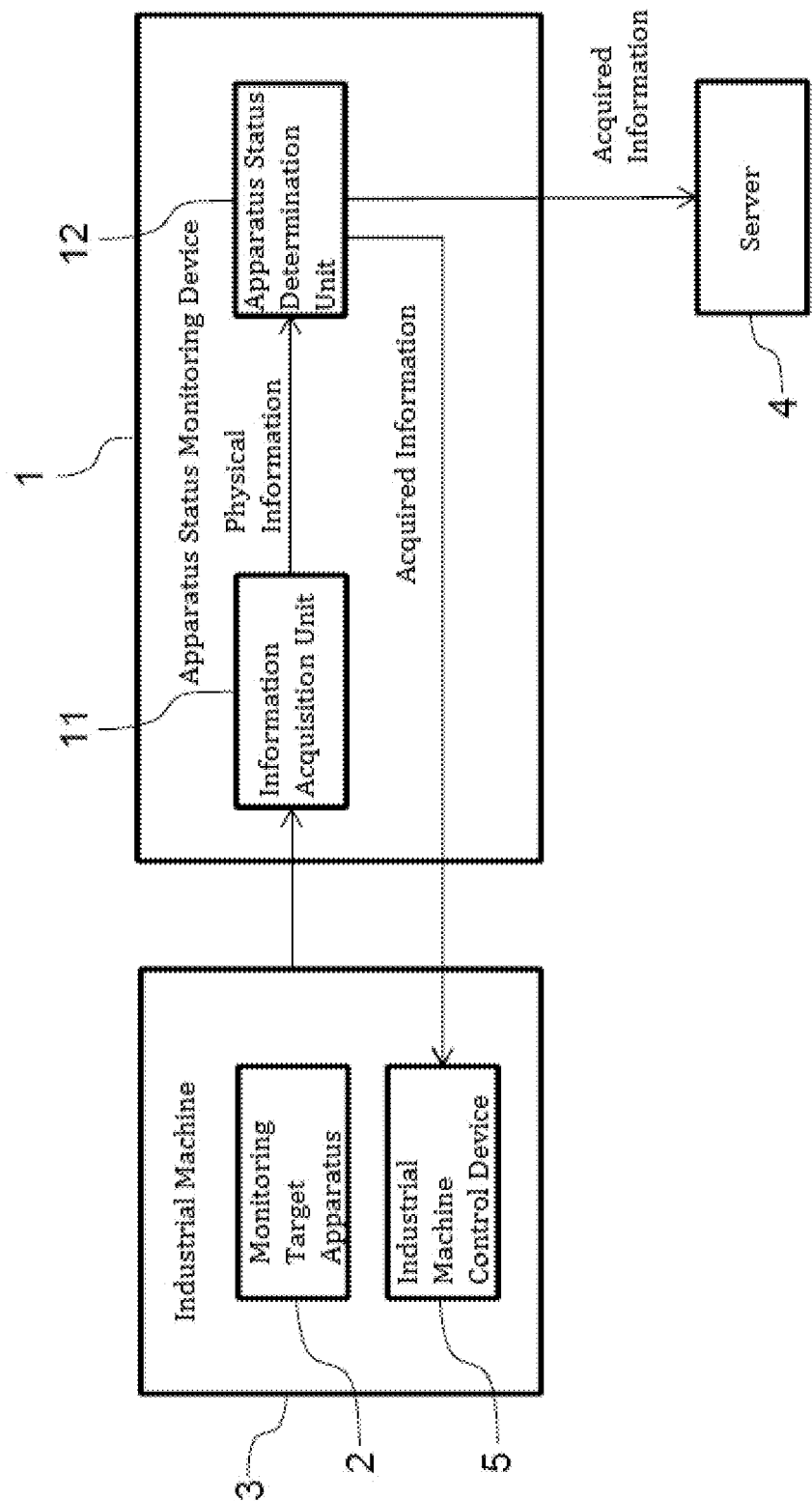
FIG. 6 is a block diagram showing an apparatus status monitoring device according to a first modification example of this embodiment.

Next, a description is given of a first modification example in which a result of monitoring by the apparatus status monitoring device 1 is used to control the industrial machine 3. FIG. 6 is a block diagram showing an apparatus status monitoring device 1 according to the first modification example of this embodiment. In an example shown in FIG. 1, the apparatus status monitoring device 1 is independent of the industrial machine 3.

In contrast to this, the apparatus status monitoring device 1 of the first modification example is characterized in that a result of monitoring the monitoring target apparatus 2 is used to control the industrial machine 3.

Specifically, in the first modification example shown in FIG. 6, an apparatus status determination unit 12 outputs acquired information by the apparatus status determination unit 12 to an industrial machine control device 5 that controls an operation of the industrial machine 3.

The industrial machine control device 5 controls an operation of the industrial machine 3 based on the acquired information by the apparatus status determination unit 12 inputted from the apparatus status determination unit 12. For example, in a case where the acquired information by the apparatus status determination unit 12 is malfunction information, the industrial machine control device 5 shuts down the industrial machine 3 in accordance with the malfunction information. Furthermore, in a case where the acquired information by the apparatus status determination unit 12 is malfunction prediction information, the industrial machine control device 5 may shut down the industrial machine 3 in accordance with the malfunction prediction information or may limit an actuation force or a movable range of the industrial machine 3 in accordance with the malfunction prediction information.

Also in the first modification example, without directly providing a sensor in the monitoring target apparatus 2 built in the industrial machine 3, a status of the monitoring target apparatus 2 can be monitored. Furthermore, an operation of the industrial machine 3 can be controlled based on acquired information by the apparatus status determination unit 12, and thus the industrial machine 3 can be prevented from performing a faulty operation or can be kept in an actuated state until maintenance timing.

Second Modification Example

Figure 7:
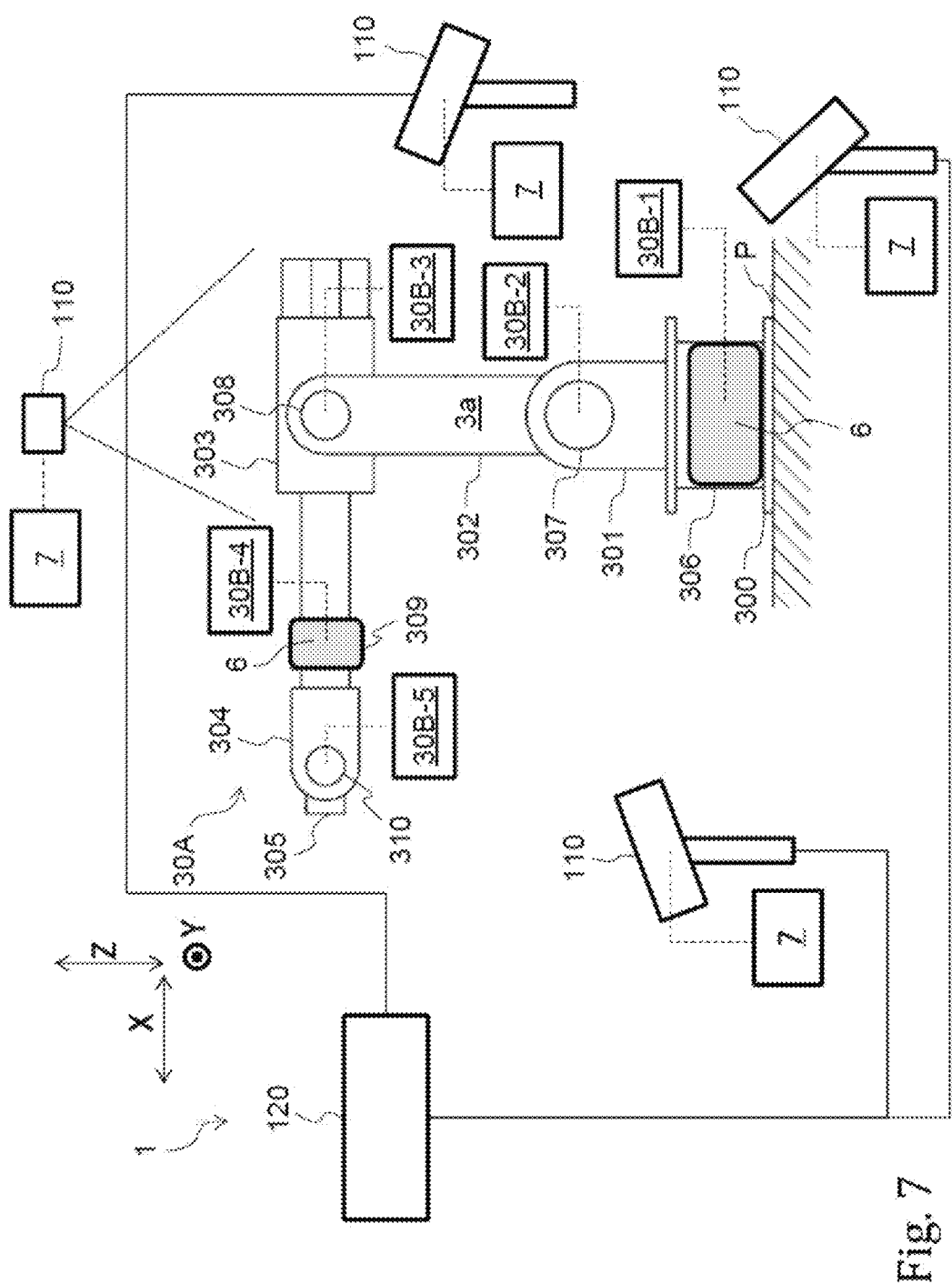
FIG. 7 is a view showing an application example in which an apparatus status monitoring device according to a second modification example of this embodiment is applied to an industrial robot.

Next, a description is given of a second modification example in which a status of a speed reducer 30B built in an industrial robot 30A is monitored. FIG. 7 is a view showing an application example in which an apparatus status monitoring device 1 according to the second modification example of this embodiment is applied to the industrial robot 30A.

As shown in FIG. 7, in the second modification example, the industrial robot 30A having at least one rotation shafts 306 to 310 represents the industrial machine 3. More specifically, the industrial robot 30A has a mounting portion 300, first to fifth arms 301 to 305, and the first to fifth rotation shafts 306 to 310.

The mounting portion 300 is provided at a predetermined mounting position P, such as on a floor, for mounting the industrial robot 30A.

The first rotation shaft 306 connects the mounting portion 300 to one end of the first arm 301. The first rotation shaft 306 includes a first speed reducer 30B-1 built therein, which decelerates rotation of an unshown motor and outputs the rotation, and the rotation thus outputted from the first speed reducer 30B-1 is transmitted to the first rotation shaft 306, causing the first rotation shaft 306 to rotate about an axis direction parallel to a Z direction (namely, a vertical direction) in FIG. 7.

The first arm 301 extends from the one end thereof connected to the mounting portion 300 toward the other end thereof. The first arm 301 rotates following rotation of the first rotation shaft 306 positioned on a side nearer to the mounting position P than the first arm 301 about the axis direction of the first rotation shaft 306.

A second rotation shaft 307 connects the other end of the first arm 301 to one end of a second arm 302. The second rotation shaft 307 includes a second speed reducer 30B-2 built therein, which decelerates rotation of an unshown motor and outputs the rotation, and the rotation thus outputted from the second speed reducer 30B-2 is transmitted to the second rotation shaft 307, causing the second rotation shaft 307 to rotate about an axis direction orthogonal to the Z direction. While in a state shown in FIG. 7, the axis direction of the second rotation shaft 307 is parallel to a Y direction, on a side nearer to the mounting position P than the second rotation shaft 307, the axis direction of the second rotation shaft 307 changes with rotation of the first rotation shaft 306 having the axis direction different from that of the second rotation shaft 307.

The second arm 302 extends from the one end thereof connected to the first arm 301 toward the other end thereof. The second arm 302 rotates following rotation of the first and second rotation shafts 306 and 307 positioned on a side nearer to the mounting position P than the second arm 302 about the axis directions of the first and second rotation shafts 306 and 307.

The third rotation shaft 308 connects the other end of the second arm 302 to a one end side of the third arm 303. The third rotation shaft 308 includes a third speed reducer 30B-3 built therein, which decelerates rotation of an unshown motor and outputs the rotation, and the rotation thus outputted from the third speed reducer 30B-3 is transmitted to the third rotation shaft 308, causing the third rotation shaft 308 to rotate about an axis direction parallel to the axis direction of the second rotation shaft 307. While in the state shown in FIG. 7, the axis direction of the third rotation shaft 308 is parallel to the Y direction, on a side nearer to the mounting position P than the third rotation shaft 308, the axis direction of the third rotation shaft 308 changes with rotation of the first rotation shaft 306 having the axis direction different from that of the third rotation shaft 308.

The third arm 303 extends from the one end side thereof connected to the second arm 302 toward the other end thereof. The third arm 303 rotates following rotation of the first to third rotation shafts 306 to 308 positioned on a side nearer to the mounting position P than the third arm 303 about the axis directions of the first to third rotation shafts 306 to 308.

The fourth rotation shaft 309 connects the other end of the third arm 303 to one end of the fourth arm 304. The fourth rotation shaft 309 includes a fourth speed reducer 30B-4 built therein, which decelerates rotation of an unshown motor and outputs the rotation, and the rotation thus outputted from the fourth speed reducer 30B-4 is transmitted to the fourth rotation shaft 309, causing the fourth rotation shaft 309 to rotate about an axis direction orthogonal to the axis directions of the first to third rotation shafts 306 to 308. While in the state shown in FIG. 7, the axis direction of the fourth rotation shaft 309 is parallel to an X direction, on a side nearer to the mounting position P than the fourth rotation shaft 309, the axis direction of the fourth rotation shaft 309 changes with rotation of the first to third rotation shafts 306 to 308 having the axis directions different from that of the fourth rotation shaft 309.

The fourth arm 304 extends from the one end thereof connected to the third arm 303 toward the other end thereof. The fourth arm 304 rotates following rotation of the first to fourth rotation shafts 306 to 309 positioned on a side nearer to the mounting position P than the fourth arm 304 about the axis directions of the first to fourth rotation shafts 306 to 309.

The fifth rotation shaft 310 connects the other end of the fourth arm 304 to one end of the fifth arm 305. The fifth rotation shaft 310 includes a fifth speed reducer 30B-5 built therein, which decelerates rotation of an unshown motor and outputs the rotation, and the rotation thus outputted from the fifth speed reducer 30B-5 is transmitted to the fifth rotation shaft 310, causing the fifth rotation shaft 310 to rotate about an axis direction parallel to the second rotation shaft 307. While in the state shown in FIG. 7, the axis direction of the fifth rotation shaft 310 is parallel to the Y direction, on a side nearer to the mounting position P than the fifth rotation shaft 310, the axis direction of the fifth rotation shaft 310 changes with rotation of the first and fourth rotation shafts 306 and 309 having the axis directions different from that of the fifth rotation shaft 310.

The fifth arm 305 extends from the one end thereof connected to the fourth arm 304 toward the other end thereof. The fifth arm 305 rotates following rotation of the first to fifth rotation shafts 306 to 310 positioned on a side nearer to the mounting position P than the fifth arm 305 about the axis directions of the first to fifth rotation shafts 306 to 310.

As shown in FIG. 7, in the second modification example, on a surface 3a of the industrial robot 30A, specifically, on each of respective surfaces of the first and fourth rotation shafts 306 and 309, there is provided a temperature-sensitive coating film 6 as one example of a thermochromic member whose color changes depending on a temperature. The temperature-sensitive coating film 6 is a film formed by applying a temperature-sensitive coating material on a surface of the industrial machine 3. The temperature-sensitive coating film 6 may be provided also on each of respective surfaces of the rotation shafts 307, 308, and 310 other than the respective surfaces of the first rotation shaft 306 and the fourth rotation shaft 309, and on the surface 3a of the industrial robot 30A other than the respective surfaces of the rotation shafts.

As shown in FIG. 7, an information acquisition unit 11 of the second modification example has a plurality of cameras 110 that capture images of the temperature-sensitive coating films 6 provided on the surface 3a of the industrial robot 30A. Furthermore, the information acquisition unit 11 of the second modification example has a control device 120 that acquires a temperature of each of the respective surfaces of the rotation shafts 306 and 309 based on an image captured by a corresponding one of the cameras 110, namely, coloration of the temperature-sensitive coating film 6 that changes depending on a temperature. According to the information acquisition unit 11 of the second modification example, with a captured image of the temperature-sensitive coating film 6 provided directly on the surface 3a of the industrial robot 30A used as a basis, a temperature of the surface 3a of the industrial robot 30A can be detected with accuracy.

The plurality of cameras 110 are disposed away from the surface 3a of the industrial robot 30A so as to surround the industrial robot 30A from a lateral side and an upper side. The cameras 110 are disposed so as to surround the industrial robot 30A, and thus blind spots of the cameras 110 on the temperature-sensitive coating films 6, namely, the surface 3a of the industrial robot 30A can be reduced.

As shown in FIG. 7, the apparatus status monitoring device 1 of the second modification example is provided with a drive unit 7 that drives each of the cameras 110 to change an image capturing range. The drive unit 7 may have an actuator such as a motor that causes each of the cameras 110 to rotate so that an orientation of an optical axis thereof is displaced. An operation of the drive unit 7 may be controlled by the control device 120. For example, in a case where the temperature-sensitive coating film 6 is displaced as the industrial robot 30A moves, the drive unit 7 may drive the cameras 110 to move following a displacement of the temperature-sensitive coating film 6 so that an image of the temperature-sensitive coating film 6 can be captured in a continuous manner.

The control device 120 functions also as an apparatus status determination unit 12 (namely, a status estimation unit 121 and a malfunction prediction unit 122) of the second example. Based on a temperature of the surface 3a of the industrial robot 30A acquired from a captured image of the temperature-sensitive coating film 6, the control device 120 determines whether the speed reducer 30B built in the industrial robot 30A is in a predetermined state, for example, an abnormal state or a state where a malfunction is predicted to occur within a predetermined time period.

In the example shown in FIG. 7, based on a temperature of the surface of the first rotation shaft 306, the control device 120 determines whether the first speed reducer 30B-1 built in the first rotation shaft 306 is in the predetermined state. Furthermore, based on a temperature of the surface of the fourth rotation shaft 309, the control device 120 determines whether the fourth speed reducer 30B-4 built in the fourth rotation shaft 309 is in the predetermined state.

Operation Example

Figure 8:
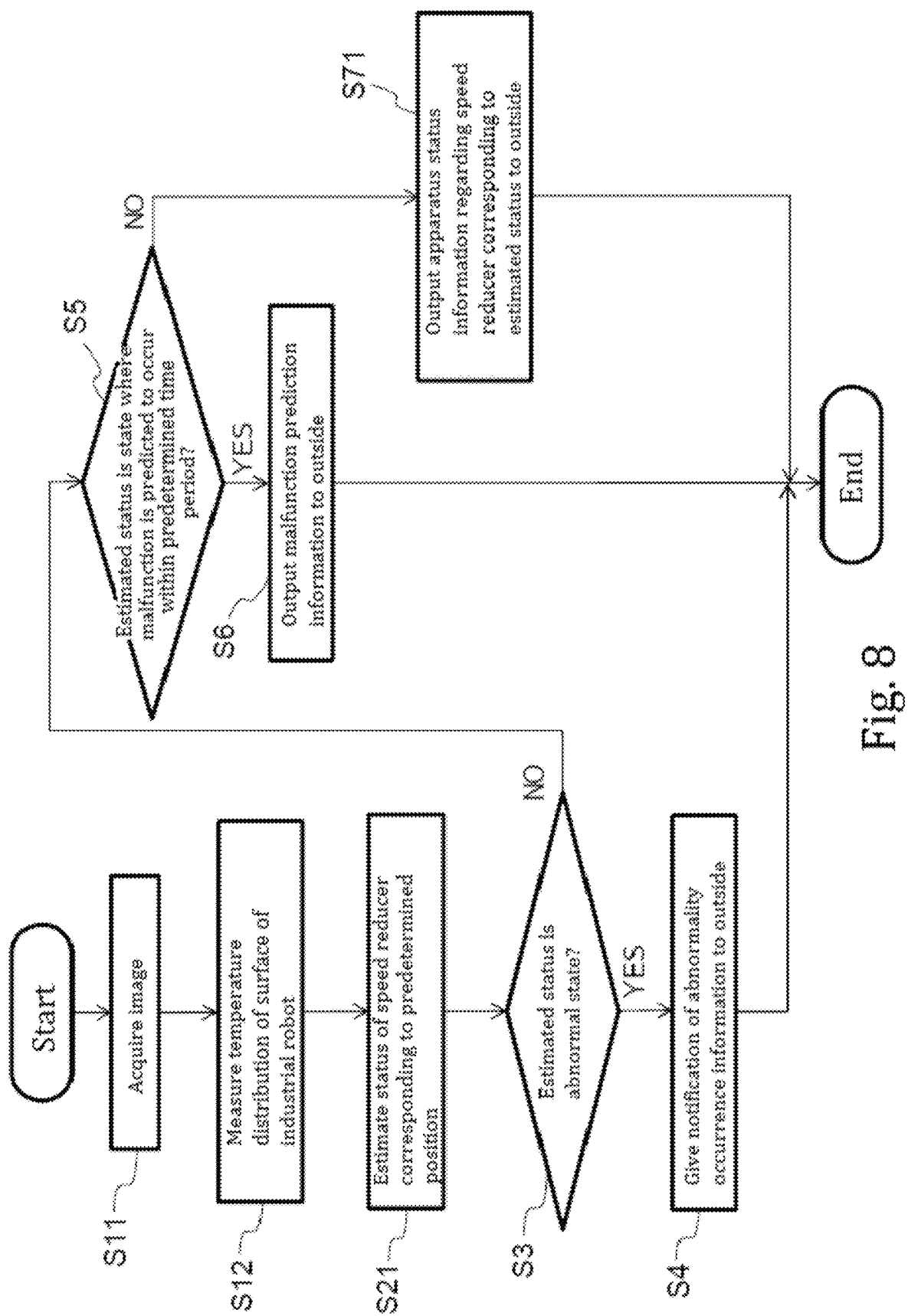
FIG. 8 is a flow chart showing an operation example of the apparatus status monitoring device according to the second modification example of this embodiment.

Next, a description is given of an operation example of the apparatus status monitoring device 1 of the second modification example. FIG. 8 is a flow chart showing the operation example of the apparatus status monitoring device 1 according to the second modification example. During an operation of the industrial robot 30A, the apparatus status monitoring device 1 continually performs processing shown in the flow chart of FIG. 8. A procedure shown in this flow chart is repeatedly implemented as required.

As shown in FIG. 8, in the second modification example, step S11 and step S12 are implemented as the process of acquiring physical information regarding the surface 3a of the industrial machine 3 described with reference to FIG. 5 (step S1). Specifically, first, each of the cameras 110 acquires a captured image of the temperature-sensitive coating film 6 provided on the surface 3a of the industrial robot 30A (step S11). After the captured image of the temperature-sensitive coating film 6 has been acquired, based on the thus acquired captured image of the temperature-sensitive coating film 6, the control device 120 measures a temperature distribution on the surface 3a of the industrial robot 30A (step S12).

Next, a status of a speed reducer corresponding to a position of the temperature-sensitive coating film 6, which is indicated by the thus measured temperature distribution, is estimated (step S21). After the status of the speed reducer has been estimated, the control device 120 determines whether the thus estimated status of the speed reducer is the abnormal state (step S3). That is, based on a result of a comparison between a temperature at a predetermined position on the surface 3a of the industrial robot 30A and a determination threshold value (an abnormality determination threshold value) for determining presence or absence of the abnormal state, the control device 120 determines whether the speed reducer corresponding to the predetermined position is in the abnormal state. Specifically, the control device 120 determines whether a temperature of the surfaces of the first rotation shaft 306 and the fourth rotation shaft 309, on each of which the temperature-sensitive coating film 6 is provided, has exceeded a predetermined threshold value.

Herein, the abnormal state refers to, for example, a malfunction state of the first speed reducer 30B-1 built in the first rotation shaft 306 or the fourth speed reducer 30B-4 built in the fourth rotation shaft 309.

The abnormality determination threshold value varies depending not only on a temperature but also on various pieces of physical information acquired by the information acquisition unit 11. Furthermore, a "state where physical information has exceeded the abnormality determination threshold value" as one example of a criterion for an abnormal state determination includes both of the following cases: a case where a value of physical information itself exceeds the abnormality determination threshold value, such as the previously mentioned temperature, and a case where a value calculated from physical information for an abnormality determination exceeds the abnormality determination threshold value (the same applies hereinafter).

In a case where the estimated status of the speed reducer is the abnormal state (YES at step S3), the control device 120 outputs abnormality occurrence information to outside (step S4).

On the other hand, in a case where the estimated status of the speed reducer is not the abnormal state (NO at step S3), the control device 120 determines whether the estimated status of the speed reducer is the state where a malfunction is predicted to occur within a predetermined time period (step S5).

Figure 9:
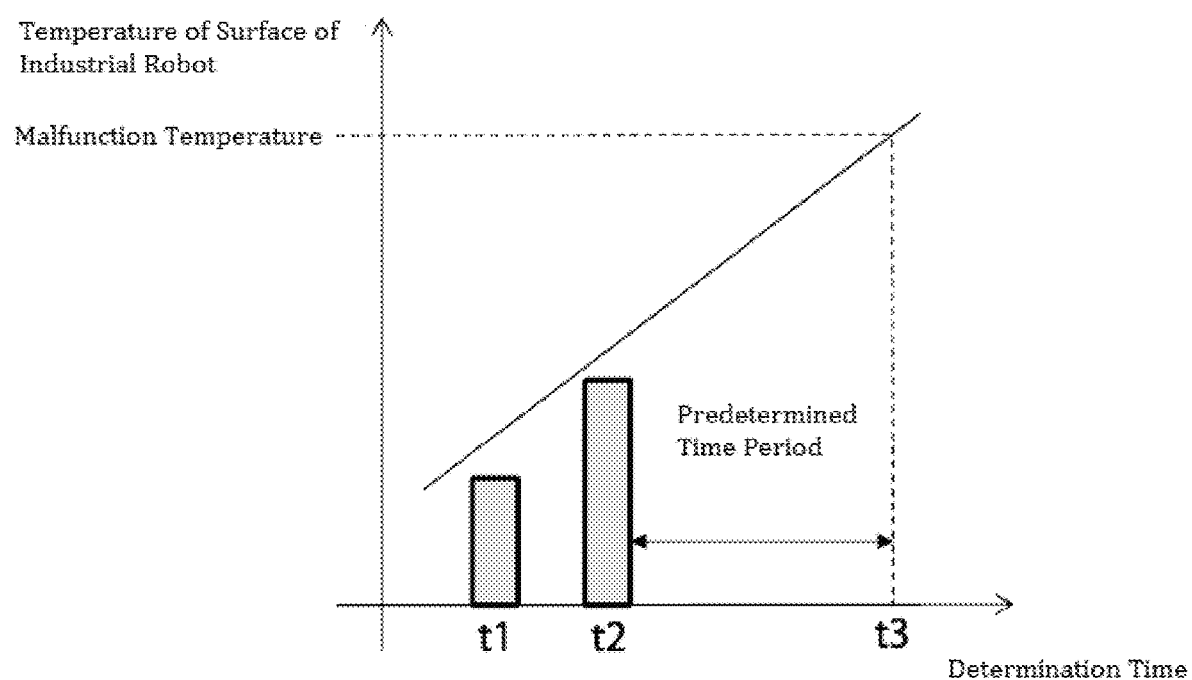
FIG. 9 is an explanatory view for explaining a malfunction prediction process in the operation example of the apparatus status monitoring device according to the second modification example of this embodiment.

FIG. 9 is an explanatory view for explaining a malfunction prediction process in the operation example of the apparatus status monitoring device 1 according to the second modification example of this embodiment. For example, as shown in FIG. 9, based on a result of a comparison between a temperature at a predetermined position on the surface 3a of the industrial robot 30A and a malfunction prediction determination threshold value, the control device 120 determines whether there is established the state where a malfunction is predicted to occur within a predetermined time period (step S5). In this case, when a temperature at the predetermined position on the surface 3a of the industrial robot 30A has exceeded the malfunction prediction determination threshold value, the control device 120 may determine that there is established the state where a malfunction is predicted to occur within a predetermined time period.

Specifically, in an example shown in FIG. 9, the control device 120 compares a time-dependent change in temperature at a predetermined position on an industrial robot surface with a malfunction temperature (the malfunction prediction determination threshold value) at which a malfunction of a speed reducer related to the predetermined position occurs. There is no particular limitation on a specific method for acquiring a time-dependent change in temperature, and as the method, there can be used, for example, a regression analysis based on temperature values that have been acquired up to a current determination time t2. While in the example shown in FIG. 9, a time-dependent change in temperature is acquired as a linear function of time, it may also be acquired as a function other than a linear function. In comparing a time-dependent change in temperature with the malfunction temperature, the control device 120 calculates, based on the time-dependent change in temperature, a length of time between a time t3 at which a temperature of the industrial robot surface is predicted to reach the malfunction temperature and the current determination time t2 as the predetermined time period. That is, in a case where a time-dependent change in temperature exceeds the malfunction temperature in a time range from the current determination time t2 to the time t3 after a lapse of the predetermined time period therefrom, the control device 120 determines that the speed reducer is in the state where a malfunction is predicted to occur within a predetermined time period.

The malfunction prediction determination threshold value varies depending not only on a temperature but also on various pieces of physical information acquired by the information acquisition unit 11. Furthermore, a "state where physical information has exceeded the malfunction prediction determination threshold value" as one example of a criterion for a malfunction prediction determination includes both of the following cases: a case where a value of physical information itself exceeds the malfunction prediction determination threshold value, such as the previously mentioned temperature calculated from a temperature of the surface 3a of the industrial robot 30A, and a case where a value calculated from physical information for a malfunction prediction determination exceeds the malfunction prediction determination threshold value (the same applies hereinafter).

In a case where the estimated status of the speed reducer is the state where a malfunction is predicted to occur within a predetermined time period (YES at step S5), the control device 120 outputs malfunction prediction information to outside (step S6).

On the other hand, in a case where the estimated status of the speed reducer is not the state where a malfunction is predicted to occur within a predetermined time period (No at step S5), the control device 120 outputs a piece of apparatus status information regarding the speed reducers 30B-1 and 30B-4 corresponding to the estimated status of the speed reducer to outside (step S71).

According to the second modification example, the temperature-sensitive coating film 6 is provided on the surface of each of the rotation shafts 306 and 309 closest to the speed reducers 30B-1 and 30B-4, respectively, and based on a captured image of the temperature-sensitive coating film 6, a temperature of the surface of each of the rotation shafts 306 and 309 is acquired. Thus, based on a temperature, a status of each of the speed reducers 30B-1 and 30B-4 can be grasped without directly providing a sensor in the each of the reducers 30B-1 and 30B-4.

Third Modification Example

Figure 10:
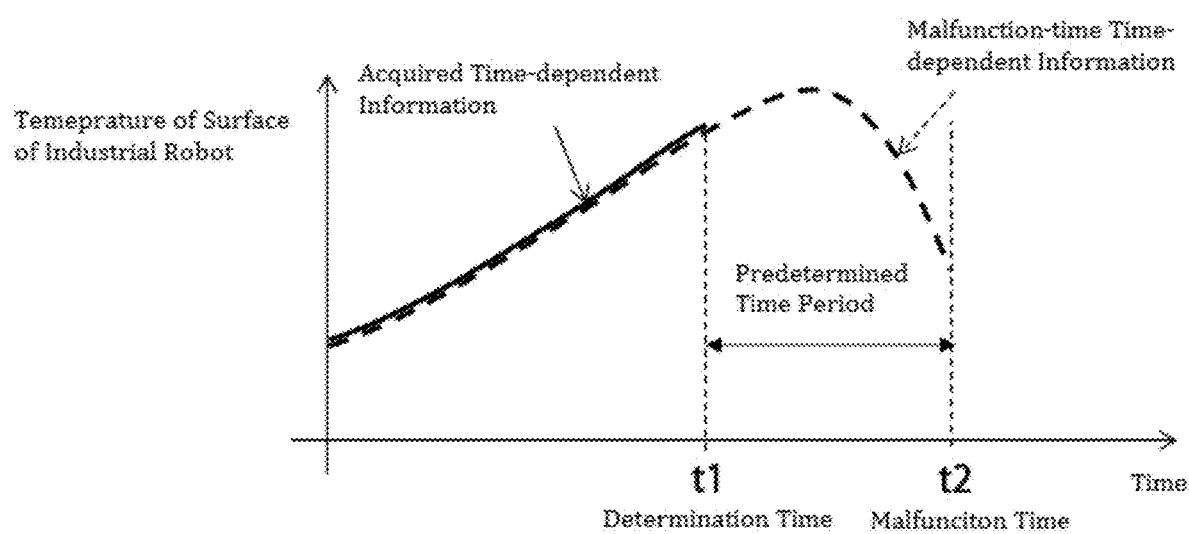
FIG. 10 is an explanatory view for explaining a malfunction prediction process in an operation example of an apparatus status monitoring device according to a third modification example of this embodiment.

Next, a description is given of a third modification example in which pre-acquired information regarding a time-dependent change in physical information at a time of a malfunction is used to perform a malfunction prediction. FIG. 10 is an explanatory view for explaining a malfunction prediction process in an operation example of an apparatus status monitoring device 1 according to the third modification example of this embodiment.

With reference to FIG. 9 showing the second modification example, there has been described an example in which a malfunction prediction determination is performed based on whether a temperature of the industrial robot surface exceeds the malfunction temperature.

In contrast to this, in the third modification example, as shown in FIG. 10, the control device 120 compares a time-dependent change in temperature of an industrial robot surface (hereinafter, referred to also as acquired time-dependent information) with a pre-acquired time-dependent change in temperature of the industrial robot surface at a time of a malfunction (hereinafter, referred to also as a malfunction-time time-dependent information) and calculates a degree of agreement between these pieces of time-dependent information. Then, in a case where the thus calculated degree of agreement has exceeded a malfunction prediction determination threshold value, the control device 120 determines that an estimated status of a speed reducer is the state where a malfunction is predicted to occur within a predetermined time period.

More specifically, the malfunction-time time-dependent information is information pre-acquired through an experiment or a simulation and has, as shown in FIG. 10, a piece of information at the malfunction time t2 of the speed reducer relative to a startup time of the industrial machine 3 as a starting point. After a startup of the industrial machine 3, at a determination time t1 a predetermined time period earlier than the malfunction time t2, the control device 120 calculates a degree of agreement between the acquired time-dependent information and the malfunction-time time-dependent information and performs a determination based on a comparison between the thus calculated degree of agreement and the malfunction prediction determination threshold value.

There is no particular limitation on specific aspects of the degree of agreement between the acquired time-dependent information and the malfunction-time time-dependent information as long as the degree has a value increasing with decreasing difference between a piece of the acquired time-dependent information that has been acquired up to the determination time t1 and a corresponding piece of the malfunction-time time-dependent information (namely, a temperature difference). For example, the degree of agreement may have a value proportionate to a reciprocal of an average value of a difference between a piece of the acquired time-dependent information that has been acquired up to the determination time t1 and a corresponding piece of the malfunction-time time-dependent information.

According to the third modification example, a comparison is made between the acquired time-dependent information and the malfunction-time time-dependent information, and thus a malfunction can be predicted without providing a sensor in a speed reducer and even in a case where a malfunction cannot be predicted simply by using a linear function or any other function.

Fourth Modification Example

Figure 11:
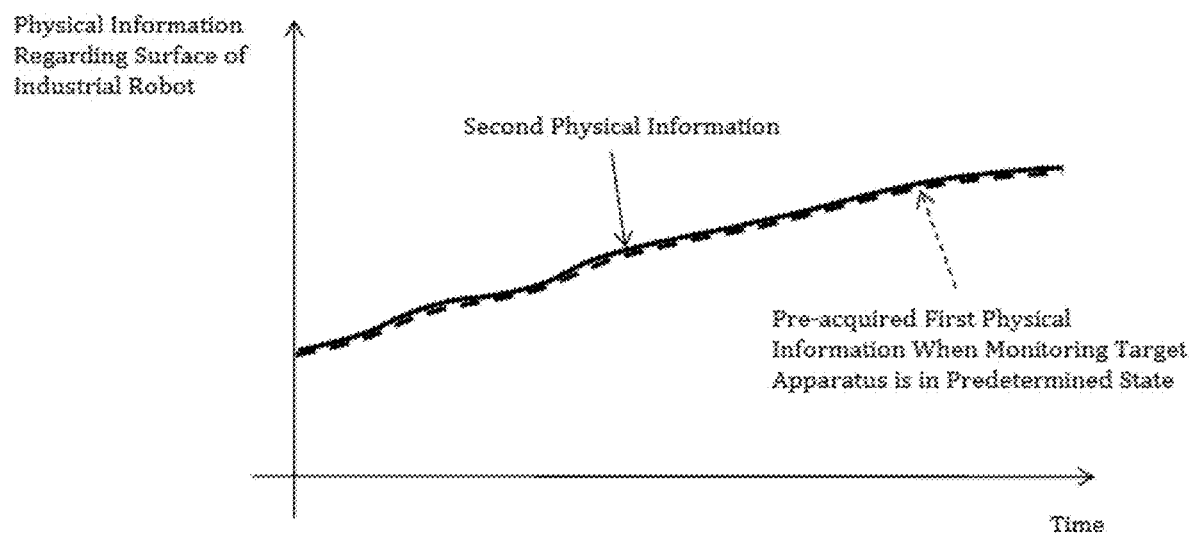
FIG. 11 is an explanatory view for explaining a process of estimating a status of a monitoring target apparatus in an operation example of an apparatus status monitoring device according to a fourth modification example of this embodiment.

Next, a description is given of a fourth modification example in which a status of the monitoring target apparatus 2 is estimated based on a comparison with a piece of physical information pre-acquired when the monitoring target apparatus 2 is in a predetermined state (not necessarily the malfunction state). FIG. 11 is an explanatory view for explaining a process of estimating a status of the monitoring target apparatus 2 in an operation example of an apparatus status monitoring device 1 according to the fourth modification example of this embodiment.

As shown in FIG. 11, in the fourth modification example, an apparatus status determination unit 12 has pre-acquired a first piece of physical information acquired when the monitoring target apparatus 2 is in the predetermined state (not necessarily the malfunction state). In an example shown in FIG. 11, the first piece of physical information is a piece of time-dependent information indicating a change over time in physical information. The time-dependent information may be acquired through, for example, an experiment or a simulation that has been performed beforehand. Furthermore, the time-dependent information may vary depending on a condition such as a use environment or a time period of use of the industrial robot 30A.

The apparatus status determination unit 12 compares a second piece of physical information acquired by an information acquisition unit 11 with the first piece of physical information. Then, in a case where the second piece of physical information agrees with the first piece of physical information, the apparatus status determination unit 12 determines that the monitoring target apparatus 2 is in the predetermined state (not necessarily the malfunction state). The agreement mentioned here is not limited to an exact agreement and may include a case where an error of the second piece of physical information with respect to the first piece of physical information is not more than a threshold value (namely, a case where the degree of agreement exceeds a threshold value). On the other hand, in a case where the second piece of physical information does not agree with the first piece of physical information, the apparatus status determination unit 12 determines that the monitoring target apparatus 2 is not in the predetermined state.

According to the fourth modification example, a second piece of physical information acquired by the information acquisition unit 11 is compared with a known first piece of physical information acquired when the monitoring target apparatus 2 is in a predetermined state (not necessarily the malfunction state), and thus it can be easily estimated whether the monitoring target apparatus 2 is in the predetermined state (not necessarily the malfunction state).

Fifth Modification Example

Figure 12:
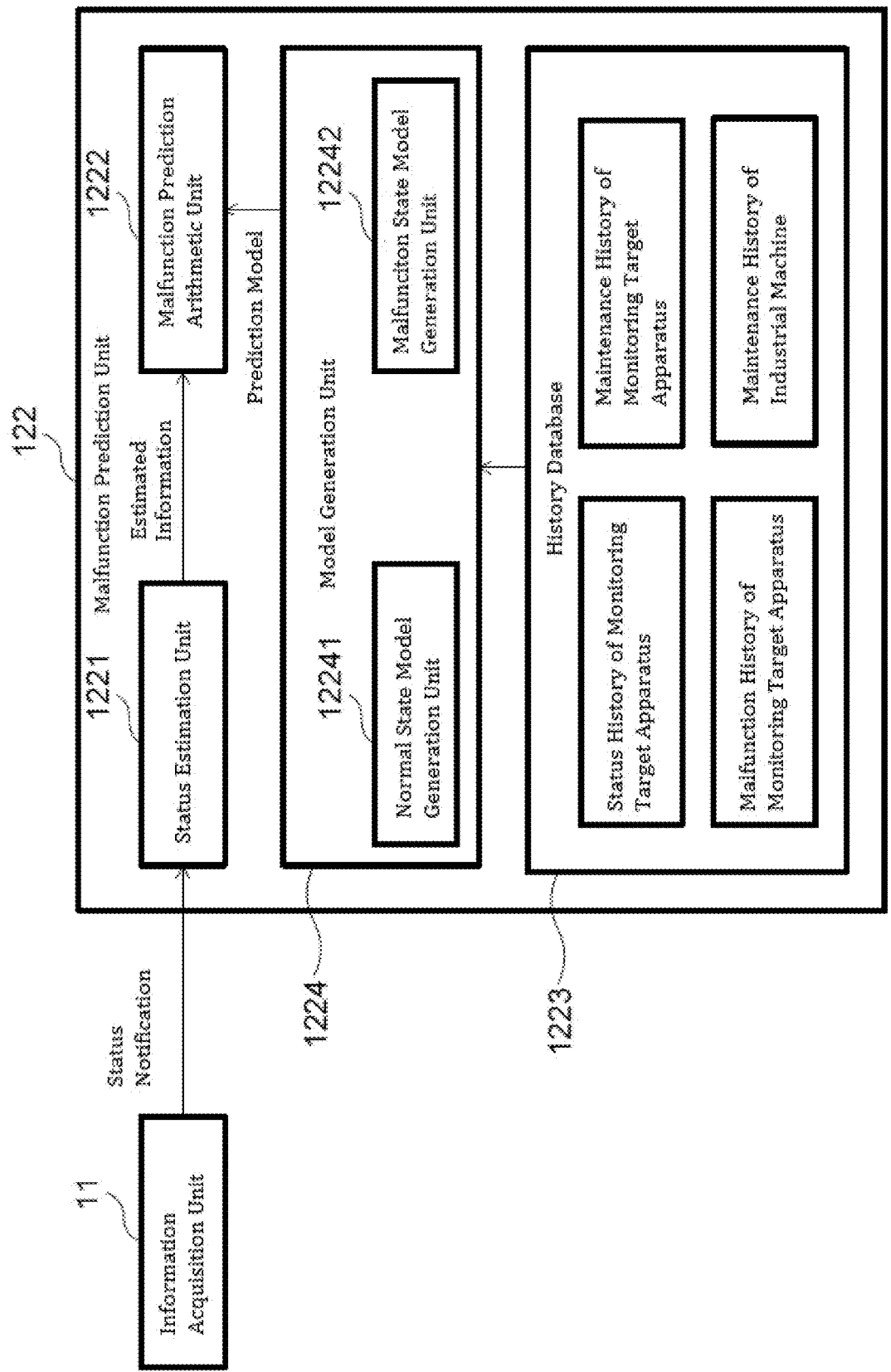
FIG. 12 is an explanatory view for explaining a malfunction prediction process in an operation example of an apparatus status monitoring device according to a fifth modification example of this embodiment.

Next, a description is given of a fifth modification example in which a calculation model for a malfunction prediction is generated from a maintenance history of the industrial machine 3 in the past and a status history, a malfunction history, and a maintenance history of the monitoring target apparatus 2 in the past, and the malfunction prediction is performed based on this calculation model. FIG. 12 is an explanatory view for explaining a malfunction prediction process in an operation example of an apparatus status monitoring device 1 according to the fifth modification example of this embodiment.

Based on a status determination model generated from history information that is a result of determining a status of a built-in object based on acquired physical information, a malfunction prediction unit 122 determines whether there is established the state where a malfunction is predicted to occur within a predetermined time period.

Specifically, the malfunction prediction unit 122 has a history database 1223 storing a maintenance history of the industrial machine 3 that is history information including at least timing at which maintenance of the industrial machine 3 was performed, a status history of the monitoring target apparatus 2 retaining, as history information, at least a status of the monitoring target apparatus 2 together with timing at which the status was established, a malfunction history of the monitoring target apparatus 2 that is history information including at least timing at which a malfunction occurred in the monitoring target apparatus 2, and a maintenance history of the monitoring target apparatus 2 that is history information including at least timing at which maintenance of the monitoring target apparatus 2 was performed.

When the history database 1223 has all of these histories, a malfunction prediction can be performed with higher accuracy. The history database 1223, however, is not necessarily required to retain all of these histories and is only required to have at least any one of these histories. Furthermore, the longer a time period in which the histories are retained, the higher accuracy in malfunction prediction can be achieved. This time period, however, could be set as appropriate based on a relationship with a product lifetime of the monitoring target apparatus 2, a relationship with a frequency of occurrence of a malfunction in the monitoring target apparatus 2, or a capacity of a storage unit (not shown) that stores the history database 1223.

In this modification example, the storage unit and a status estimation unit 1221 that estimates a status of the monitoring target apparatus 2 are provided so as to be physically integral with each other. However, when, as the storage unit, an external storage unit such as a server on a cloud or the like is used via a communication line such as the Internet, the issue of storage capacity is practically resolved.

Moreover, the malfunction prediction unit 122 has a model generation unit 1224 that generates a calculation model for a malfunction prediction from the various types of histories stored in the history database 1223. The model generation unit 1224 generates a calculation model for a malfunction prediction by using, for example, a known modeling technique so that the calculation model is most suited for temporal changes stored in the status history of the monitoring target apparatus 2 and the malfunction history of the monitoring target apparatus 2, respectively.

At this time, by the model generation unit 1224, two or more calculation models for a malfunction prediction may be provided. For example, there may be provided a normal state model generation unit 12241 that generates a normal state calculation model by using, among pieces of the status history of the monitoring target apparatus 2, a piece of history information indicating that a malfunction has not occurred within a predetermined time period, and a malfunction state model generation unit 12242 that generates a malfunction state calculation model by using, among pieces of the status history of the monitoring target apparatus 2, a piece of history information indicating that a malfunction has occurred within the predetermined time period Based on reliability in determining whether a normal state or a malfunction state is established, a plurality, such as three or more, of calculation models may be provided. By this configuration, a determination can be performed with higher reliability.

For example, when a status of the monitoring target apparatus 2 inputted from the status estimation unit 1221 is analogous more to the malfunction state model than to the normal state model, the malfunction prediction unit 122 determines that there is established the state where a malfunction is predicted to occur within a predetermined time period.

In this modification example, the model generation unit 1224 is provided so as to be physically integral with a malfunction prediction arithmetic unit 1222 and so on. There is, however, no limitation thereto, and a calculation model may be generated on, for example, a server on a cloud or the like via a communication line such as the Internet. In this case, compared with a case of using an incorporated apparatus, there are advantages such as that a calculation speed is relatively increased and that a model generation algorithm can be more easily changed ex-post facto.

The calculation model generated by the model generation unit 1224 is sent to the malfunction detection arithmetic unit 1222. Then, estimated information that is information estimated by the status estimation unit 1221 is inputted to said model, and based on an arithmetic result thereof, a malfunction prediction is performed.

At this time, when a plurality of calculation models are present, a common piece of information estimated by the status estimation unit 1221 is inputted to each of the plurality of calculation models, and based on arithmetic results thereof, a malfunction prediction is performed by using a preset evaluation criterion.

In this modification example, the malfunction prediction arithmetic unit 1222, the status estimation unit 1221 and so on are provided so as to be physically integral with each other. There is, however, no limitation thereto, and an arithmetic operation may be performed on, for example, a server on a cloud or the like via a communication line such as the Internet. In this case, compared with a case of using an incorporated apparatus, there are provided advantages such as that a calculation speed is relatively increased and that a preset evaluation criterion can be more easily changed ex-post facto.

Sixth Modification Example

Figure 13:
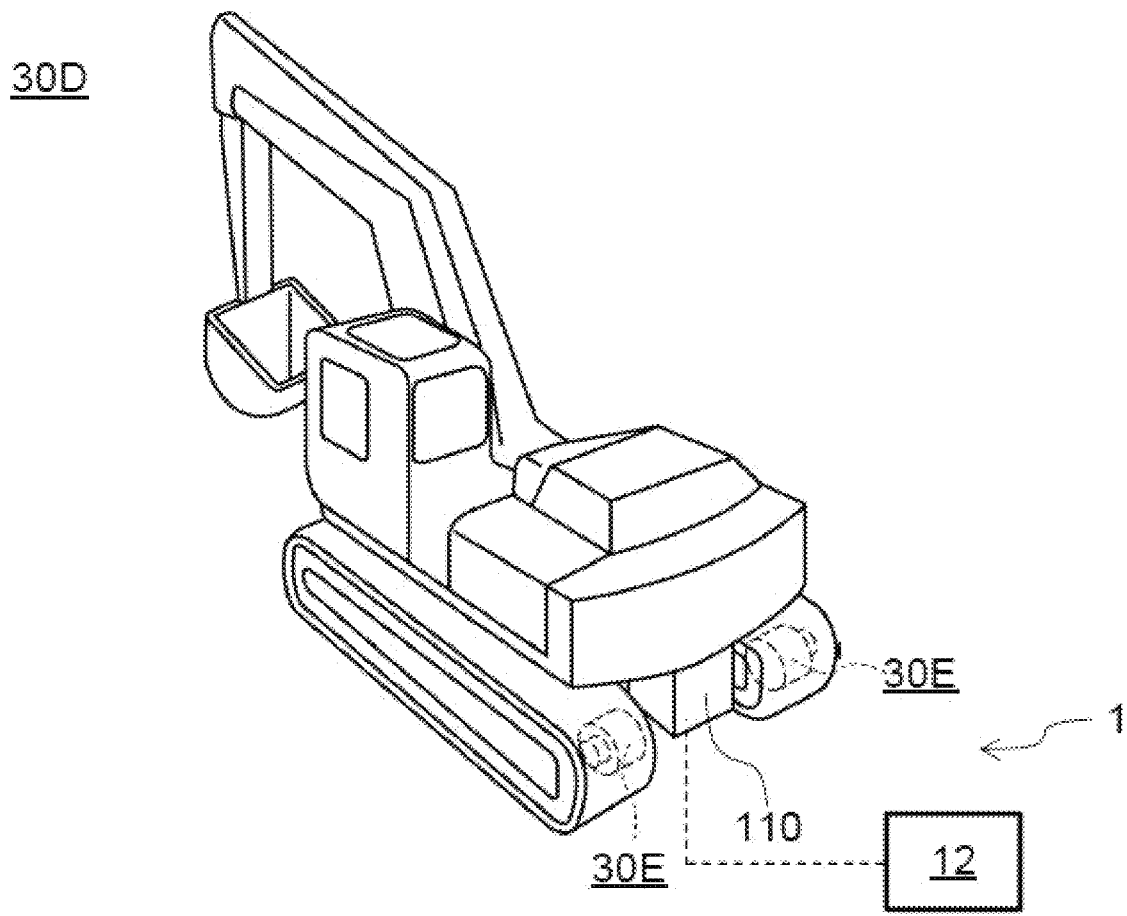
FIG. 13 is a view showing an application example in which an apparatus status monitoring device according to a sixth modification example of this embodiment is applied to a travel motor for a construction machine.
Figure 14:
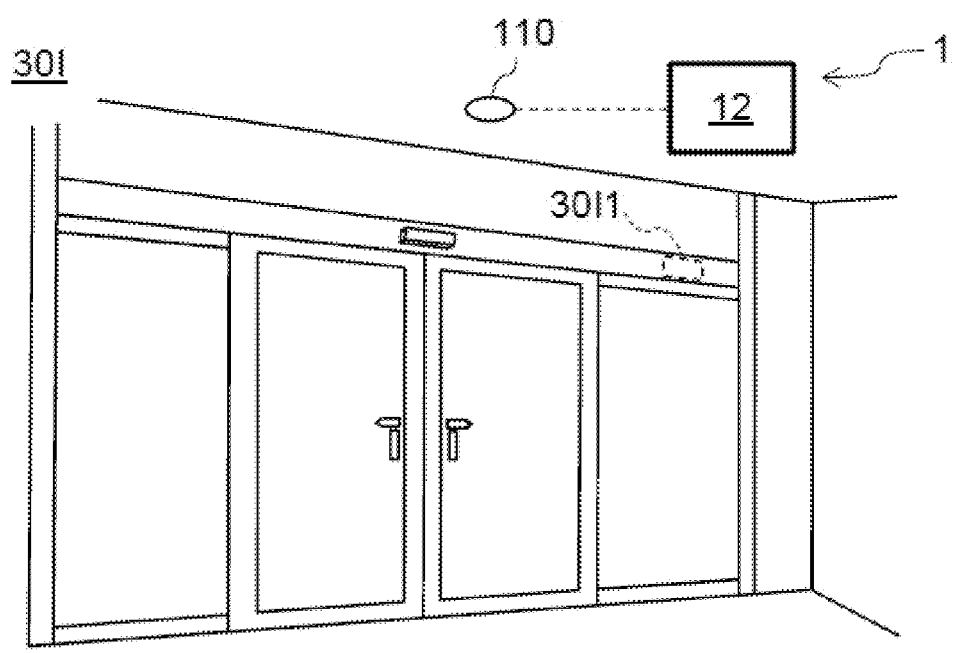
FIG. 14 is a view showing an application example in which the apparatus status monitoring device according to the sixth modification example of this embodiment is applied to an automatic door.

Next, a description is given of, as a sixth modification example, application examples in which the apparatus status monitoring device 1 is applied to any other type of industrial machine 3 than the industrial robot 30A. FIG. 13 is a view showing an application example in which an apparatus status monitoring device 1 according to the sixth modification example of this embodiment is applied to the travel motor 30E for a construction machine. FIG. 14 is a view showing an application example in which the apparatus status monitoring device 1 according to the sixth modification example of this embodiment is applied to the automatic door 30I.

In the example shown in FIG. 13, based on a captured image of the travel motor 30E for a construction machine captured by a camera 110 installed in the construction machine 30D, an information acquisition unit 11 (not shown) of the apparatus status monitoring device 1 acquires physical information (for example, a strain or a vibration of a surface of the travel motor 30E for a construction machine) manifested outside the travel motor 30E for a construction machine. Then, based on the thus acquired physical information, an apparatus status determination unit 12 of the apparatus status monitoring device 1 performs a determination of a status of the monitoring target apparatus 2 (for example, a planetary gear) built in the travel motor 30E for a construction machine.

In the example shown in FIG. 14, based on a captured image of a transom portion of the automatic door 30I captured by a camera 110 installed in a vicinity of the automatic door 30I (for example, on a ceiling), the information acquisition unit 11 (not shown) of the apparatus status monitoring device 1 acquires physical information (for example, a temperature manifested as coloration of the temperature-sensitive coating film 6) regarding a surface of the transom portion of the automatic door 30I. Then, based on the thus acquired physical information, the apparatus status determination unit 12 of the apparatus status monitoring device 1 performs a determination (for example, an abnormality determination or a malfunction prediction determination) of a status of an electric motor 30I1 built in the transom portion.

Figure 15:
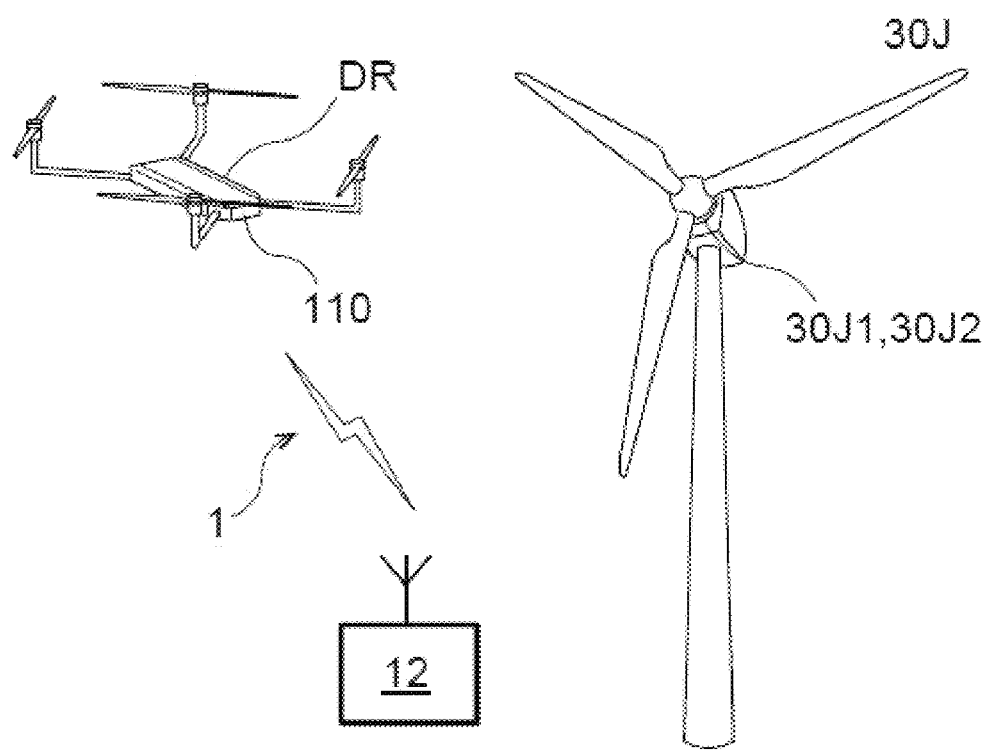
FIG. 15 is a view showing an application example in which the apparatus status monitoring device according to the sixth modification example of this embodiment is applied to a wind turbine for wind power generation.

In an example shown in FIG. 15, based on a captured image of a nacelle of the wind turbine 30J for wind power generation captured by an unmanned aerial vehicle DR (a drone) that is equipped with a camera 110 and flies in a vicinity of the wind turbine 30J, the information acquisition unit 11 (not shown) of the apparatus status monitoring device 1 acquires physical information (for example, a temperature manifested as coloration of the temperature-sensitive coating film 6) regarding a surface of the nacelle of the wind turbine 30J. Then, based on the thus acquired physical information, the apparatus status determination unit 12 of the apparatus status monitoring device 1 performs a determination (for example, an abnormality determination or a malfunction prediction determination) of a status of a speed increaser 30J1 or a drive motor 30J2 built inside the nacelle.

Figure 16:
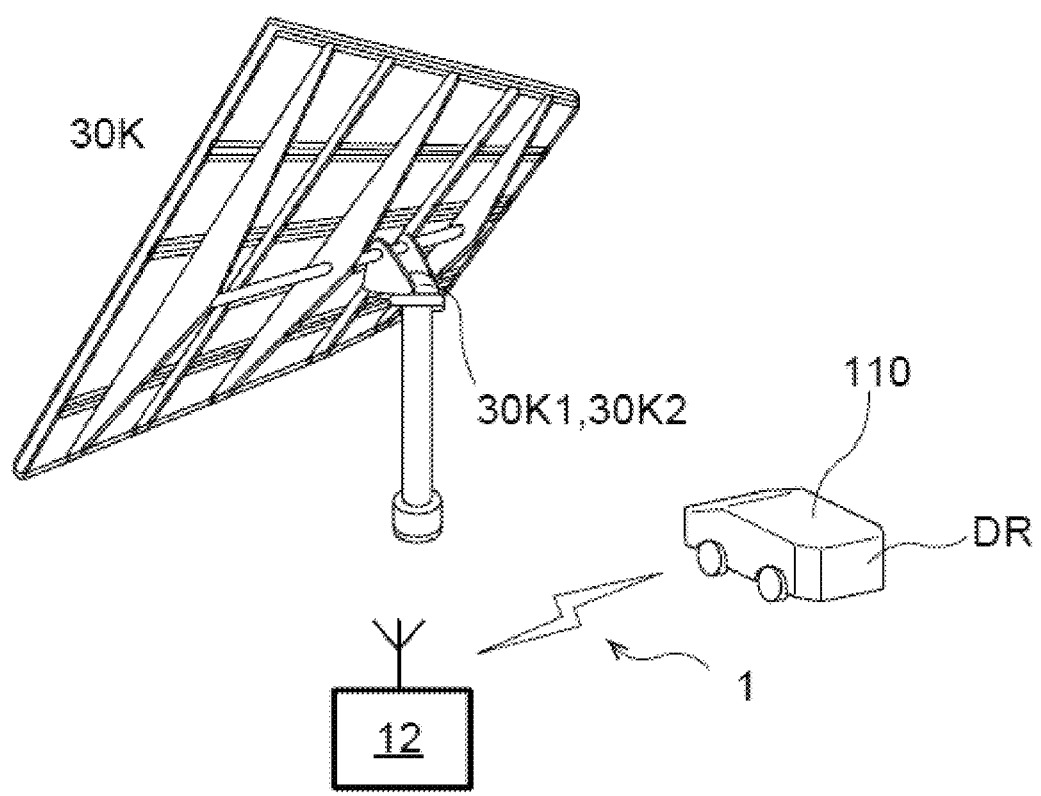
FIG. 16 is a view showing an application example in which the apparatus status monitoring device according to the sixth modification example of this embodiment is applied to a heliostat for solar thermal power generation.

In an example shown in FIG. 16, based on a captured image of a drive device of the heliostat 30K for solar thermal power generation captured by an unmanned traveling vehicle DR (a drone) that is equipped with a camera 110 and flies in a vicinity of the heliostat 30K, the information acquisition unit 11 (not shown) of the apparatus status monitoring device 1 acquires physical information (for example, a temperature manifested as coloration of the temperature-sensitive coating film 6) regarding a surface of the drive device of the heliostat 30K. Then, based on the thus acquired physical information, the apparatus status determination unit 12 of the apparatus status monitoring device 1 performs a determination (for example, an abnormality determination or a malfunction prediction determination) of a status of a speed reducer 30K1 or an electronic motor 30K2 that drives the speed reducer 30K1.

According to the sixth modification example, the apparatus status monitoring device 1 is applied to various types of industrial machines 3 and thus can be improved in versatility.

Seventh Modification Example

Next, a description is given of a seventh modification example in which a status of the monitoring target apparatus 2 is determined based on a plurality of pieces of physical information.

Figure 17:
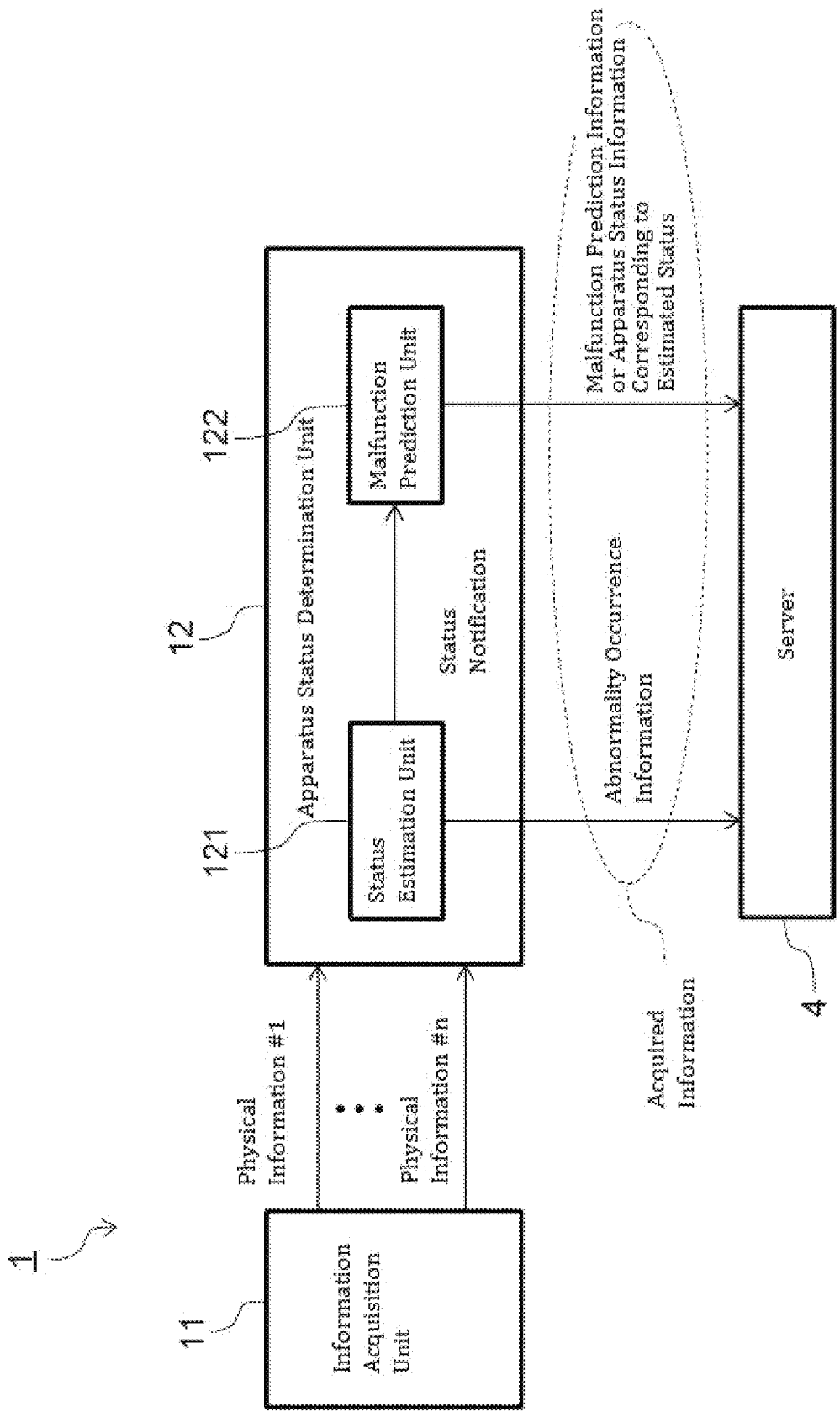
FIG. 17 is a block diagram showing a detail of an apparatus status determination unit in an apparatus status monitoring device according to a seventh modification example of this embodiment.

FIG. 17 is a block diagram showing a detail of an apparatus status determination unit 12 in an apparatus status monitoring device 1 according to the seventh modification example of this embodiment. As shown in FIG. 17, in the seventh modification example, an information acquisition unit 11 is capable of acquiring a plurality of pieces #1 to #n (n is a natural number equal to or larger than 2, the same applies hereinafter) of physical information regarding the industrial machine 3 manifested outside the industrial machine 3. There is no particular limitation on specific aspects of the plurality of pieces #1 to #n of physical information. For example, the plurality of pieces #1 to #n of physical information may be a combination of two or more selected from a temperature, a position, a strain, a displacement, a vibration, a reflectance of a sound wave, ultrasound, infrared light, or any other type of light, an electromagnetic wave absorption rate, a hue, a brightness, a saturation, a moisture amount, an oil amount, a sound, an odor, an intensity of radiation such as X-rays, an electromagnetic wave, or ultrasound, and an emission such as an exhaust gas. Specific aspects of the information acquisition unit 11 for acquiring these types of physical information have already been described by way of examples.

(Status Estimation Unit 121) In a case where the plurality of pieces #1 to #n of physical information have been acquired, based on the thus acquired plurality of pieces #1 to #n of physical information, a status estimation unit 121 estimates a status of the monitoring target apparatus 2. Moreover, the status estimation unit 121 determines whether the thus estimated status of the monitoring target apparatus 2 is a predetermined state, for example, the abnormal state or the state where a malfunction is predicted to occur within a predetermined time period.

Based on a result of a comparison between the acquired plurality of pieces #1 to #n of physical information and abnormality determination threshold values (hereinafter, each referred to also as an individual abnormality determination threshold value) corresponding respectively thereto, the status estimation unit 121 determines whether the status of the monitoring target apparatus 2 is the abnormal state. Furthermore, based on a result of a comparison between a combination of the acquired plurality of pieces #1 to #n of physical information and a corresponding set of abnormality determination threshold values, the status estimation unit 121 determines whether the status of the monitoring target apparatus 2 is the abnormal state.

The individual abnormality determination threshold value is a threshold value that enables a determination on whether a status of the monitoring target apparatus 2 is the abnormal state based on individual values of the plurality of pieces #1 to #n of physical information. The individual abnormality determination threshold value is, for example, a value higher than a predetermined threshold value of physical information. When at least one of the plurality of pieces #1 to #n of physical information has exceeded a corresponding one of the individual abnormality determination threshold values, the status estimation unit 121 may determine that the status of the monitoring target apparatus 2 is the abnormal state.

The set of abnormality determination threshold values is a set of threshold values that enables a determination on whether a status of the monitoring target apparatus 2 is the abnormal state based on the combination of the plurality of pieces #1 to #n of physical information. The set of abnormality determination threshold values may be, for example, a combination of threshold values lower than the individual abnormality determination threshold values related respectively to the plurality of pieces #1 to #n of physical information. Furthermore, the number of threshold values constituting the set of abnormality determination threshold values may be lower than the number of measured pieces of physical information and may be even one.

In a case where an abnormality determination based on the individual abnormality determination threshold value has determined that the abnormal state is not established, the status estimation unit 121 may perform an abnormality determination based on the set of abnormality determination threshold values. Furthermore, depending on a status of the monitoring target apparatus 2, in place of an abnormality determination based on the individual abnormality determination threshold value, an abnormality determination based on the set of abnormality determination threshold values may be performed. For example, when a status of the monitoring target apparatus 2 is not suited for an abnormality determination using the individual abnormality determination threshold value as in a case of a correlation established between the previously mentioned plurality of pieces #1 to #n of physical information, an abnormality determination may be performed based only on the set of abnormality determination threshold values.

There are cases where in an individual determination with respect to each of the pieces #1 to #n of physical information, the individual abnormality determination threshold value is not exceeded, and thus it cannot be determined that the abnormal state is established, while in an overall determination with respect to the combination of the plurality of pieces #1 to #n of physical information, it should be determined that the abnormal state is established. For example, there are cases where when all of the plurality of pieces #1 to #n of physical information have a value not exceeding but approximating the individual abnormality determination threshold value, taken as a whole, it should be determined that the abnormal state is established. Furthermore, depending on a status of the monitoring target apparatus 2, there are cases where an abnormality determination based on an overall determination with respect to the combination of the pieces #1 to #n of physical information is more suited as a technique for determining the status of the monitoring target apparatus 2 than an abnormality determination based on an individual determination with respect to the pieces #1 to #n of physical information. According to the seventh modification example, an abnormality determination is performed based on both of the individual abnormality determination threshold value and the set of abnormality determination threshold values, and thus the abnormal state can be properly detected.

When it is determined that a state of the monitoring target apparatus 2 is the abnormal state, the status estimation unit 121 outputs abnormality occurrence information to the external server 4.

(Malfunction Prediction Unit 122) Based on a result of a comparison between the acquired plurality of pieces #1 to #n of physical information and malfunction prediction determination threshold values (hereinafter, each referred to also as an individual prediction determination threshold value) corresponding respectively thereto, a malfunction prediction unit 122 determines whether a status of the monitoring target apparatus 2 is the state where a malfunction is predicted to occur within a predetermined time period. Furthermore, based on a result of a comparison between a combination of the acquired plurality of pieces #1 to #n of physical information and a corresponding set of malfunction prediction determination threshold values, the malfunction prediction unit 122 determines whether the status of the monitoring target apparatus 2 is the state where a malfunction is predicted to occur within a predetermined time period.

The individual prediction determination threshold value is a threshold value that enables a determination on whether a status of the monitoring target apparatus 2 is the state where a malfunction is predicted to occur within a predetermined time period based on individual values of the plurality of pieces #1 to #n of physical information. The individual prediction determination threshold value may be, for example, the malfunction temperature described in the example shown in FIG. 9 or a threshold value of the degree of agreement of time-dependent information described in the example shown in FIG. 10. When it is determined that at least one of the pieces #1 to #n of physical information exceeds the individual prediction determination threshold value based on a comparison with the individual prediction determination threshold value, the malfunction prediction unit 122 may determine that the status of the monitoring target apparatus 2 is the state where a malfunction is predicted to occur within a predetermined time period.

The set of malfunction prediction determination threshold values is a set of threshold values that enables a determination on whether a status of the monitoring target apparatus 2 is the state where a malfunction is predicted to occur within a predetermined time period based on the combination of the plurality of pieces #1 to #n of physical information. The set of malfunction prediction determination threshold values may be, for example, a combination of threshold values lower than the individual prediction determination threshold values corresponding respectively to the plurality of pieces #1 to #n of physical information. Furthermore, depending on a status of the monitoring target apparatus 2, the number of threshold values constituting the set of malfunction prediction determination threshold values may be lower than the number of pieces of physical information and may be even one.

In a case where a malfunction prediction determination based on the individual prediction determination threshold value has determined that there is not established the state where a malfunction is predicted to occur within a predetermined time period, the malfunction prediction unit 122 may perform a malfunction prediction determination based on the set of malfunction prediction determination threshold values. Furthermore, in a case where the status estimation unit 121 has determined that the abnormal state is not established, the malfunction prediction unit 122 may perform a malfunction prediction determination. Furthermore, depending on a status of the monitoring target apparatus 2, in place of a malfunction prediction determination based on the individual prediction determination threshold value, a malfunction prediction determination based on the set of malfunction prediction determination threshold values may be performed.

There are cases where in an individual determination with respect to each of the plurality of pieces #1 to #n of physical information, the individual prediction determination threshold value is not exceeded, and thus a malfunction is not detected, while in an overall determination with respect to the combination of the plurality of pieces #1 to #n of physical information, it can be determined that there is a sign of occurrence of a malfunction. Furthermore, depending on a status of the monitoring target apparatus 2, there are cases where a malfunction prediction determination based on an overall determination with respect to the combination of the pieces #1 to #n of physical information is more suited as a technique for determining the status of the monitoring target apparatus 2 than a malfunction prediction determination based on an individual determination with respect to the pieces #1 to #n of physical information. According to the seventh modification example, with both of the individual prediction determination threshold and the set of malfunction prediction determination threshold values used as a basis, future occurrence of a malfunction can be properly predicted.

Operation Example

Figure 18:
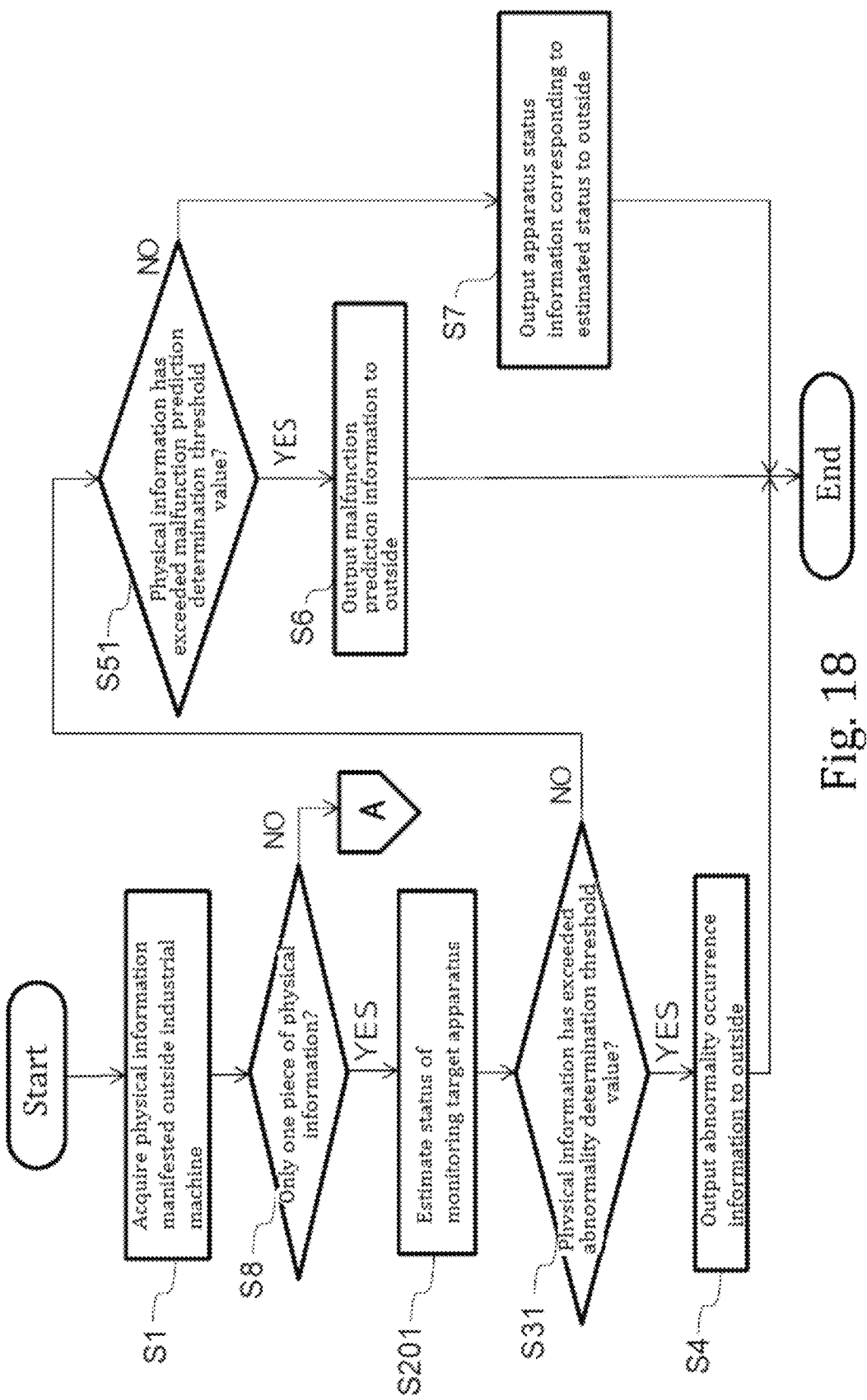
FIG. 18 is a flow chart showing an operation example of the apparatus status monitoring device according to the seventh modification example of this embodiment.

Next, a description is given of an operation example of the apparatus status monitoring device 1 according to the seventh modification example. FIG. 18 is a flow chart showing the operation example of the apparatus status monitoring device 1 according to the seventh modification example of this embodiment.

As shown in FIG. 18, first, the information acquisition unit 11 acquires physical information manifested outside the industrial machine 3 (step S1). After the physical information has been acquired, the information acquisition unit 11 determines whether the acquired physical information is composed of only one piece (namely, one type) of physical information (step S8).

In a case where the acquired physical information is composed of only one piece of physical information (YES at step S8), the information acquisition unit 11 estimates a status of the monitoring target apparatus 2 based on the acquired physical information (step S201).

Next, the status estimation unit 121 determines whether the physical information has exceeded the abnormality determination threshold value (step S31).

In a case where the abnormality determination threshold value has been exceeded (YES at step S31), the status estimation unit 121 determines that the status of the monitoring target apparatus 2 is the abnormal state and outputs abnormality occurrence information to outside (step S4). On the other hand, in a case where the abnormality determination threshold value has not been exceeded (NO at step S31), the status estimation unit 121 determines that the status of the monitoring target apparatus 2 is not the abnormal state.

In a case where the status of the monitoring target apparatus 2 is not the abnormal state, the malfunction prediction unit 122 determines whether the physical information has exceeded the malfunction prediction determination threshold value (step S51).

In a case where the malfunction prediction determination threshold value has been exceeded (YES at step S51), the malfunction prediction unit 122 determines that the status of the monitoring target apparatus 2 is the state where a malfunction is predicted to occur within a predetermined time period (that is, a malfunction has been predicted) and outputs malfunction prediction information to outside (step S6).

On the other hand, in a case where the malfunction prediction determination threshold value has not been exceeded (NO at step S51), the malfunction prediction unit 122 outputs a piece of apparatus status information corresponding to the estimated status to outside (step S7).

Figure 19:
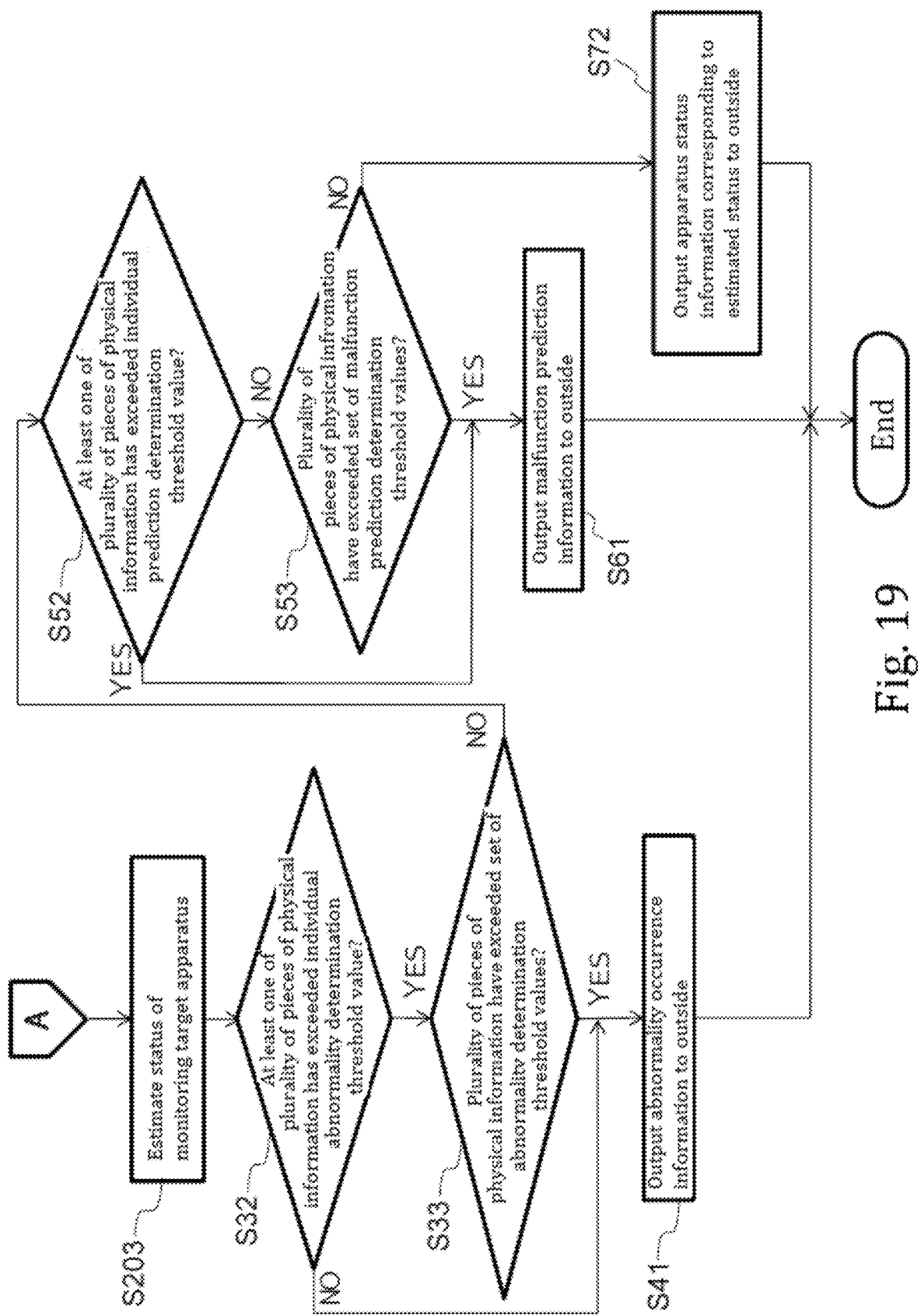
FIG. 19 is a flow chart, as a continuation of FIG. 18, showing the operation example of the apparatus status monitoring device according to the seventh modification example of this embodiment.

FIG. 19 is a flow chart, as a continuation of FIG. 18, showing the operation example of the apparatus status monitoring device 1 according to the seventh modification example of this embodiment.

In a case where the number of pieces of physical information constituting the acquired physical information is not only one (NO at step S8 in FIG. 18), the information acquisition unit 11 estimates the status of the monitoring target apparatus 2 based on the acquired plurality of pieces of physical information (step S203).

Next, the status estimation unit 121 determines whether at least one of the plurality of pieces #1 to #n of physical information has exceeded the individual abnormality determination threshold value (step S32).

In a case where the individual abnormality determination threshold value has been exceeded (YES at step S32), the status estimation unit 121 determines that the status of the monitoring target apparatus 2 is the abnormal state and outputs abnormality occurrence information to outside (step S41). On the other hand, in a case where the individual abnormality determination threshold value has not been exceeded (NO at step S32), the status estimation unit 121 determines whether the plurality of pieces #1 to #n of physical information have exceeded the set of abnormality determination threshold values (step S33).

In a case where the set of abnormality determination threshold values has been exceeded (YES at step S33), the status estimation unit 121 determines that the status of the monitoring target apparatus 2 is the abnormal state and outputs abnormality occurrence information to outside (step S41). On the other hand, in a case where the set of abnormality determination threshold values has not been exceeded (NO at step S33), the status estimation unit 121 determines that the status of the monitoring target apparatus 2 is not the abnormal state.

When it is determined that the status of the monitoring target apparatus 2 is not the abnormal state, the malfunction prediction unit 122 determines whether at least one of the plurality of pieces #1 to #n of physical information has exceeded the individual prediction determination threshold value (step S52).

In a case where the individual prediction determination threshold value has been exceeded (YES at step S52), the malfunction prediction unit 122 determines that the status of the monitoring target apparatus 2 is the state where a malfunction is predicted to occur within a predetermined time period (namely, a malfunction has been predicted) and outputs malfunction prediction information to outside (step S61).

On the other hand, the individual prediction determination threshold value has not been exceeded (NO at step S53), the malfunction prediction unit 122 determines whether the plurality of pieces #1 to #n of physical information have exceeded the set of malfunction prediction determination threshold values (step S53).

In a case where the set of malfunction prediction determination threshold values has been exceeded (YES at step S53), the malfunction prediction unit 122 determines that the status of the monitoring target apparatus 2 is the state where a malfunction is predicted to occur within a predetermined time period and outputs malfunction prediction information to outside (step S61). On the other hand, in a case where the set of malfunction prediction determination threshold values has not been exceeded (NO at step S53), the malfunction prediction unit 122 determines that the status of the monitoring target apparatus 2 is not the state where a malfunction is predicted to occur within a predetermined time period and outputs a piece of apparatus status information corresponding to the status of the monitoring target apparatus 2 to outside (step S72).

Figure 20:
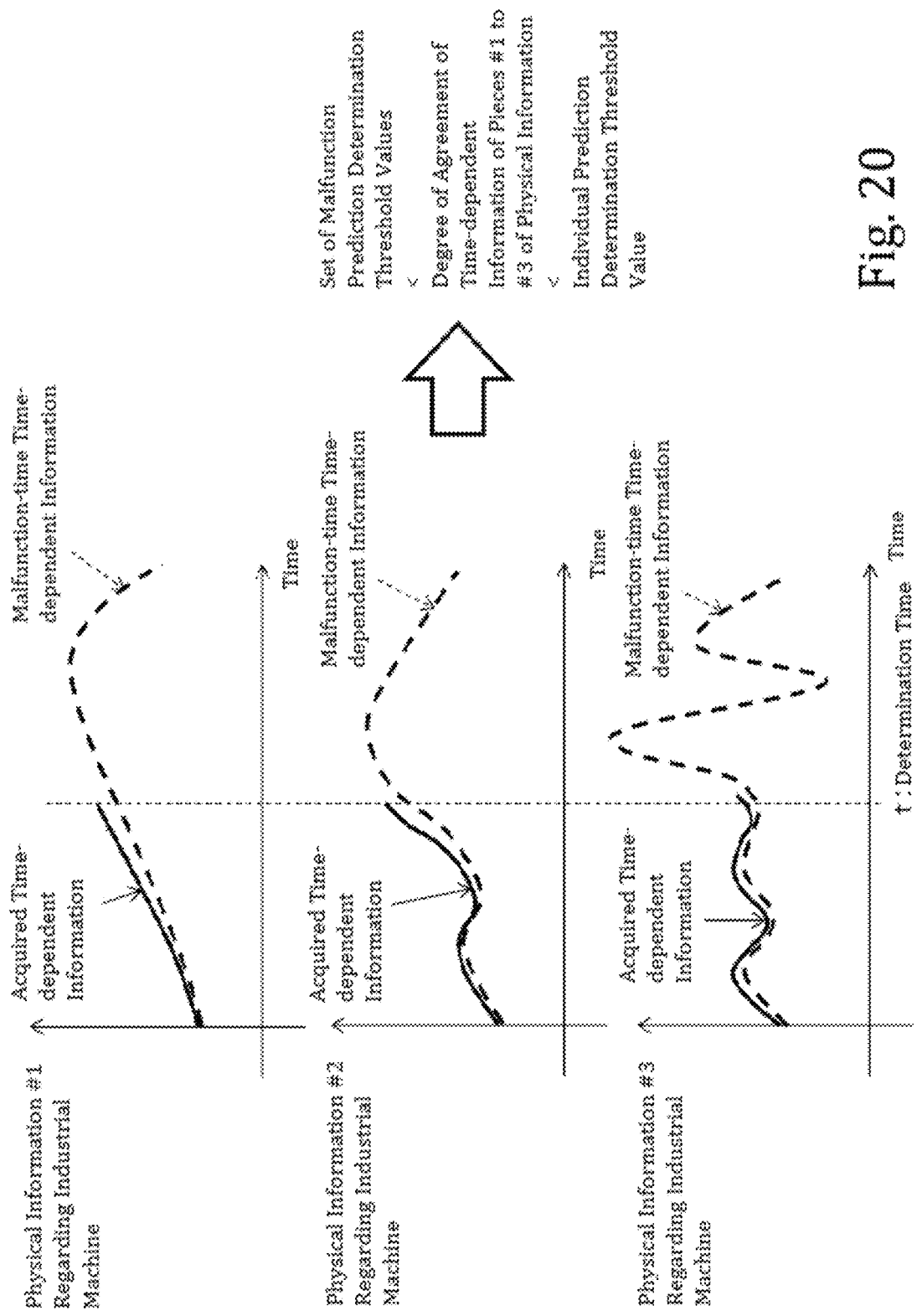
FIG. 20 is an explanatory view for explaining a malfunction prediction process based on a combination of a plurality of pieces of physical information in the operation example of the apparatus status monitoring device according to the seventh modification example of this embodiment.

FIG. 20 is an explanatory view for explaining a malfunction prediction process based on a combination of a plurality of pieces of physical information in the operation example of the apparatus status monitoring device 1 according to the seventh modification example of this embodiment. FIG. 20 shows, as a result of a comparison between the pieces #1 to #3 of physical information and the individual prediction determination threshold values corresponding thereto, a magnitude relationship between each of respective degrees of agreement of time-dependent information of the pieces #1 to #3 of physical information and a corresponding one of the individual prediction determination threshold values. Furthermore, FIG. 20 also shows, as result of a comparison between the combination of the pieces #1 to #3 of physical information and the corresponding set of malfunction prediction determination threshold values, a magnitude relationship between each of respective degrees of agreement of time-dependent information of the pieces #1 to #3 of physical information and the set of malfunction prediction determination threshold values.

In an example shown in FIG. 20, the respective degrees of agreement of time-dependent information of the pieces #1 to #3 of physical information are all smaller than the individual prediction determination threshold values corresponding respectively thereto. Because of this, in the example shown in FIG. 20, a negative determination result is obtained in the malfunction prediction determination based on a comparison with the individual prediction determination threshold value (step S52), which is shown in FIG. 19. On the other hand, in the example shown in FIG. 20, a combination of the respective degrees of agreement of time-dependent information of the pieces #1 to #3 of physical information is larger than the set of malfunction prediction determination threshold values. Because of this, in the example shown in FIG. 20, a positive determination result is obtained in the malfunction prediction determination based on a comparison with the set of malfunction prediction determination threshold values (step S53), which is shown in FIG. 19. That is, in the example shown in FIG. 20, it is determined that there is established the state where a malfunction is predicted to occur within a predetermined time period.

According to the seventh modification example, with both of the individual abnormality determination threshold value and the set of abnormality determination threshold values used as a basis, the abnormal state can be properly detected. Furthermore, with both of the individual prediction determination threshold value and the set of malfunction prediction determination threshold values used as a basis, future occurrence of a malfunction can be properly predicted.

Eighth Modification Example

Figure 21:
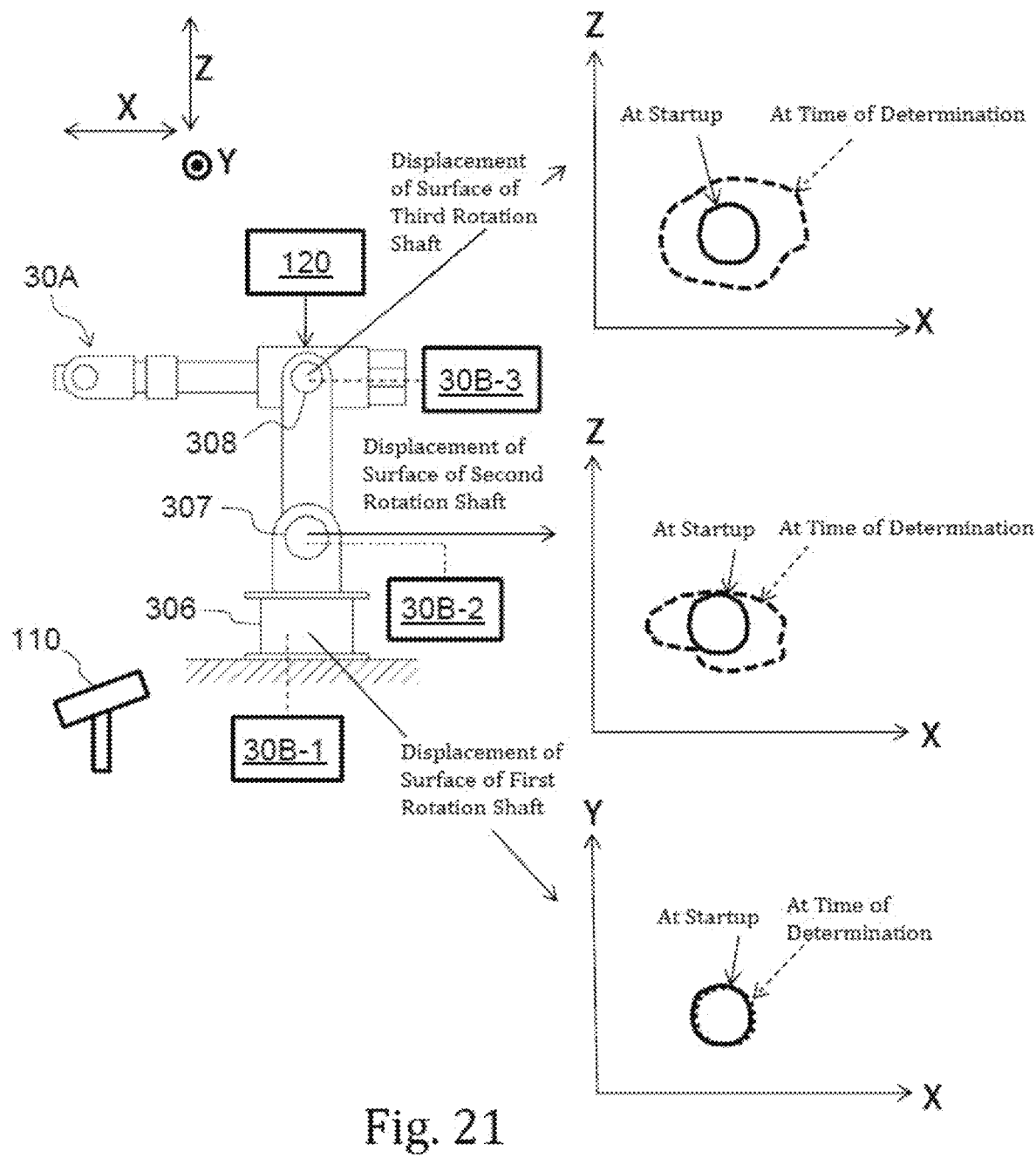
FIG. 21 is an explanatory view for explaining a process of determining a status of a monitoring target apparatus in an operation example of an apparatus status monitoring device according to an eighth example of this embodiment.

Next, a description is given of an eighth modification example in which a status of the monitoring target apparatus 2 is determined by using, as a criterion, a status of the monitoring target apparatus 2 at a startup that is an operation start time. Herein, the operation start time refers to, for example, a time when the monitoring target apparatus 2, which had been stopped from operating during the night, is started to operate again the next morning. FIG. 21 is an explanatory view for explaining a process of determining a status of the monitoring target apparatus 2 in an operation example of an apparatus status monitoring device 1 according to the eighth modification example of this embodiment.

In the eighth modification example, as physical information regarding the surface 3a of the industrial robot 30A, an information acquisition unit 11 acquires a displacement of each of the respective surfaces of the first to third rotation shafts 306 to 308 (see FIG. 21). There is no particular limitation on a specific method for acquiring a displacement of each of the respective surfaces of the first to third rotation shafts 306 to 308. For example, based on a captured image, which is captured by a camera 100, of a mark provided at a particular position on each of the surfaces of the first to third rotation shafts 306 to 308, the information acquisition unit 11 may acquire a trajectory of the mark as a displacement of the each of the surfaces of the first to third rotation shafts 306 to 308.

At both of a startup of the industrial robot 30A and a time of determining an apparatus status, the information acquisition unit 11 acquires a displacement of each of the surfaces of the first to third rotation shafts 306 to 308. At both of the startup and the time of determination, a control device 120 inputs a common operation command to the industrial robot 30A, and the information acquisition unit 11 acquires a displacement of each of the surfaces of the first to third rotation shafts 306 to 308 of the industrial robot 30A, which operate under the common operation command.

With respect to each of the first to third rotation shafts 306 to 308, the control device 120 calculates an error (hereinafter, referred to also as a displacement error) between a displacement of each of the surfaces at the startup and a displacement of the each of the surfaces at the determination time. There is no particular limitation on specific aspects of a displacement error, and a displacement error may be, for example, a difference in total displacement amount (for example, a moving distance of the mark) in a case where an operation is performed under the previously mentioned common operation command. Based on a result of a comparison between the thus calculated displacement error and a threshold value, the control device 120 determines whether any of the first to third speed reducers 30B-1 to 30B-3 built in the first to third rotation shafts 306 to 308, respectively, is in the abnormal state. In a case where the displacement error has exceeded the threshold value, the control device 120 determines that the any of the speed reducers 30B-1 to 30B-3 is in the abnormal state.

In determining presence or absence of the abnormal state, the control device 120 may perform a determination in consideration of respective positions of the surfaces whose displacements are to be acquired. For example, in an example shown in FIG. 21, the third rotation shaft 308 is disposed at a position more distant from the mounting position P than respective portions of the first rotation shaft 306 and the second rotation shaft 307. Because of this, there is a possibility that a displacement error of the third rotation shaft 308, with respective displacement errors of the first and second rotation shafts 306 and 307 added thereto, becomes larger than each of the respective displacement errors of the first and second rotation shafts 306 and 307. Thus, in determining presence or absence of the abnormal state, a threshold value of the displacement error of the third rotation shaft 308 may be set to be larger than a threshold value of each of the respective displacement errors of the first rotation shaft 306 and the second rotation shaft 307. By this configuration, a status of the third speed reducer 30B-3 built in the third rotation shaft 308 can be determined with accuracy.

According to the eighth modification example, it is determined whether the speed reducer 30B is in the abnormal state by using a status thereof at a startup as a criterion, and thus an influence of a disturbance such as an error in physical information attributable to a difference in use environment such as a season or a temperature is reduced, so that accuracy in determining a status of the speed reducer 30B can be improved. While the foregoing has described a determination of the abnormal state, the same applies to a determination of the state in which a malfunction is predicted to occur within a predetermined time period.

Furthermore, by using a status of the speed reducer 30B at a time of installing the industrial robot 30A as a criterion, the control device 120 may determine whether the speed reducer 30B is in a predetermined state. With the status at the time of installation used as a criterion, timing for replacing the speed reducer 30B due to aging deterioration thereof can be grasped.

Ninth Modification Example

Figure 22:
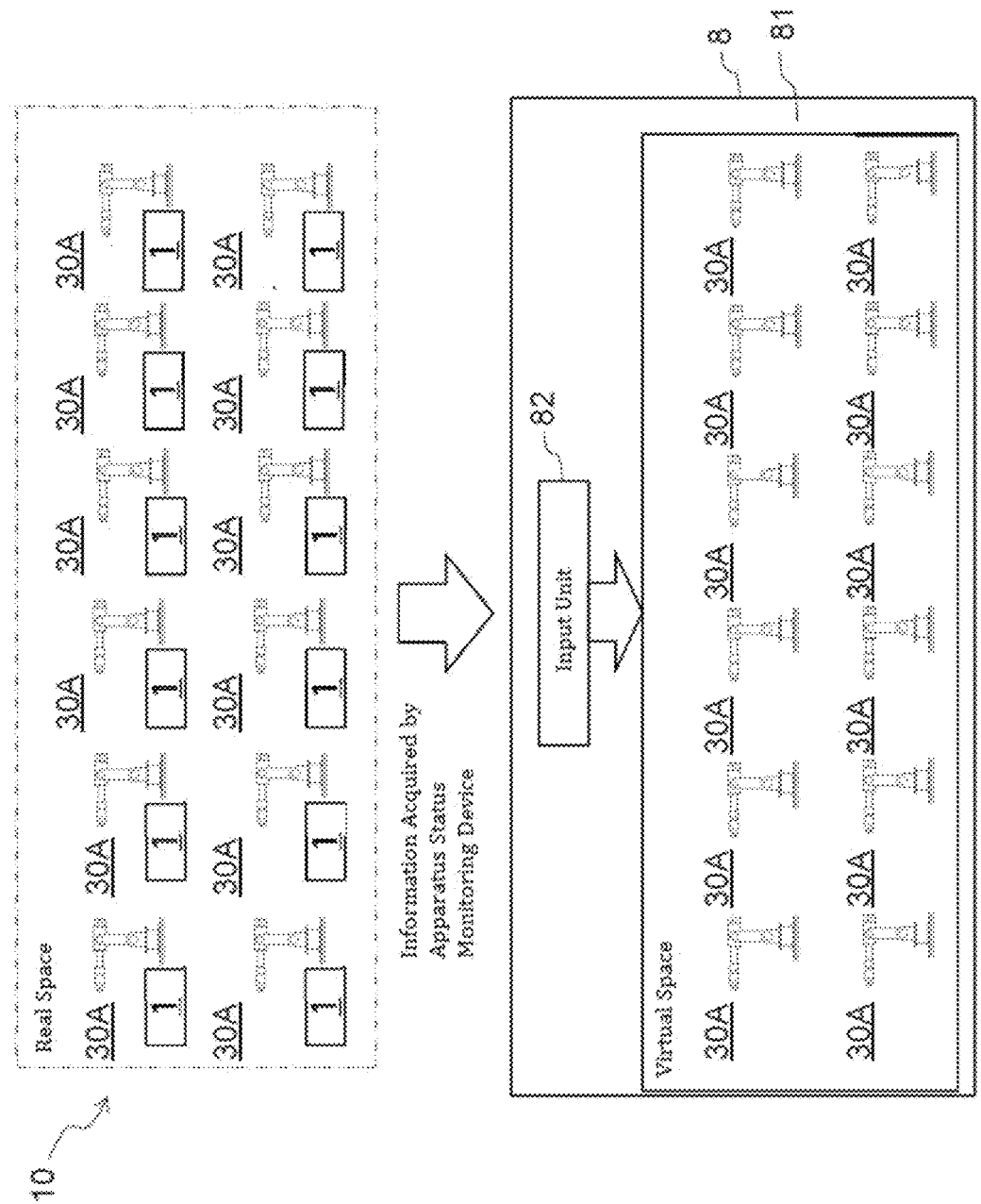
FIG. 22 is a view showing an operation checking device according to a ninth modification example of this embodiment.

Next, a description is given of, as a ninth modification example, an example of an operation checking device provided with the apparatus status monitoring device 1. FIG. 22 is a view showing an operation checking device 10 according to the ninth modification example of this embodiment.

The operation checking device 10 is provided with the apparatus status monitoring device 1 and a computer 8. The operation checking device 10 checks an operation of the industrial robot 30A in a virtual space on a storage region 81 of the computer 8. In an example shown in FIG. 22, the operation checking device 10 checks, in the virtual space, an operation of each of a plurality of industrial robots 30A arranged in a real space so as to form a production line. While in the example shown in FIG. 22, one apparatus status monitoring device 1 is provided with respect to each of the industrial robots 30A, it is not necessarily required that the number of the apparatus status monitoring devices 1 agree with the number of the industrial robots 30A. For example, one apparatus status monitoring device 1 may monitor a status of the plurality of industrial robots 30A.

The operation checking device 10 has an input unit 82. The input unit 82 inputs information acquired by the apparatus status monitoring device 1 as information related to a status of the industrial robot 30A. The information acquired by the apparatus status monitoring device 1 is, for example, the previously mentioned acquired information by the apparatus status determination unit 12 (namely, the abnormality occurrence information, the malfunction prediction information, and the apparatus status information). The information acquired by the apparatus status monitoring device 1 may include physical information acquired by the information acquisition unit 11. The input unit 82 may be, for example, a CPU. The input unit 82 may periodically acquire information from the apparatus status monitoring device 1 and input the information.

According to the ninth modification example, an updated operation status of the industrial robot 30A in the real space can be checked on the virtual space. By this configuration, an operation of the industrial robot 30A in the real space can be simulated on the virtual space. Furthermore, it also becomes possible to reflect, in the real space, a simulation result of making a process change on the virtual space.

Tenth Modification Example

Figure 23:
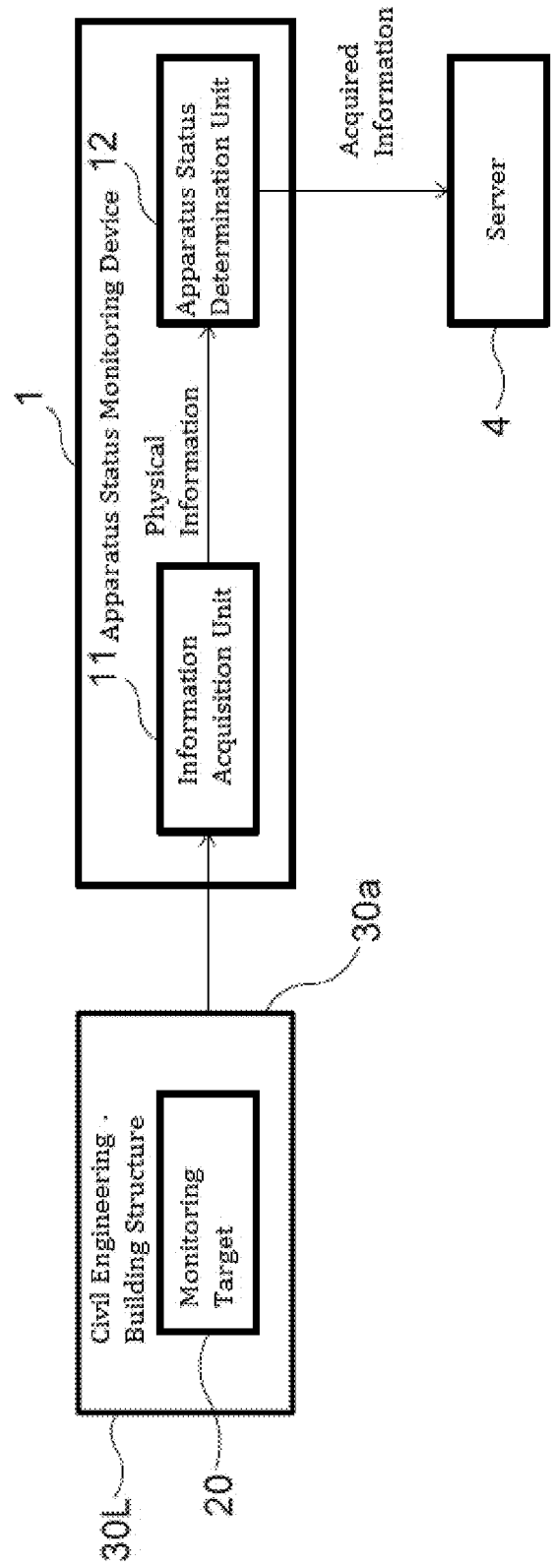
FIG. 23 is a block diagram showing a structure status monitoring device according to a tenth modification example of this embodiment.

Next, a description is given of a tenth modification example in which a status of a monitoring target 20 built in a civil engineering•building structure 30L is monitored by using an apparatus status monitoring device 1. FIG. 23 is a block diagram showing the apparatus status monitoring device 1 according to the tenth modification example of this embodiment. In an example shown in FIG. 23, the apparatus status monitoring device 1 is independent of the civil engineering•building structure 30L.

Examples of the civil engineering•building structure 30L include a wind turbine for wind power generation, a heliostat of a solar thermal power generation tower, an elevated road, a bridge, and a building. Examples of the monitoring target 20 include structural members such as a steel frame or a reinforcing steel bar provided in an inside of the civil engineering•building structure 30L, fastening members such as a bolt provided in said inside, and various types of piping for water supply and sewage and for electric wiring embedded inside. Further examples of the monitoring target 20 include civil engineering or building structures made of concrete, such as a wind turbine for wind power generation, a solar thermal power generation tower, an elevated road, a bridge, and a building, and a portion inside said concrete.

Furthermore, other examples of the civil engineering•building structure 30L include a road and a sidewalk, in which case examples of the monitoring target 20 include a common groove, a water pipe, a gas pipe and the like buried under the road or the sidewalk, and a connection portion thereof.

Other features are the same as those in this embodiment and the other modification examples of this embodiment and thus will not be described herein.

While the foregoing embodiment and modification examples have mainly described status monitoring, there is no limitation thereto, and a status of the monitoring target apparatus 2 may be checked only in any given time period at any given timing as required. In this case, physical information may be acquired by the information acquisition unit 11 only in any given time period at any given timing. Furthermore, it may also be possible that the information acquisition unit 11 acquires physical information in a continuous manner, and the apparatus status determination unit 12 performs a determination only in any given time period at any given timing.

The foregoing embodiment and modification examples may be combined as appropriate, and unless otherwise indicated, the individual configurations described in the foregoing embodiment and modification examples may be combined in any given way, or a part thereof may be omitted.

Aspects of the present invention are not limited to the foregoing embodiment and embrace various modifications conceivable by those skilled in the art. Effects of the present invention are also not limited to the above-mentioned contents. That is, various additions, changes, and partial deletions are possible in a range of not departing from the conceptual ideas and spirit of the present invention derived from contents defined in the claims and equivalents thereof.

What is claimed is:

1. A status checking device for a built-in object, comprising:
    an information acquisition unit for acquiring one or more pieces of physical information regarding an article including a target built therein as part of the article, a status of the target being unable to be directly checked from outside, the one or more pieces of physical information being manifested on an external surface of the article, the information acquisition unit acquiring the one or more pieces of physical information regarding the article from the surface of the article without contacting the surface of the article; and
    a status determination unit for determining the status of the target built in the article based on the acquired one or more pieces of physical information regarding the article,
    wherein the article includes a housing and the target is at least partially disposed within the housing such that the status of the target is unable to be directly checked from outside of the housing of the article,
    wherein the status determination unit has an abnormality determination unit that determines whether the target built in as part of the article is in an abnormal state based on the physical information regarding the article,
    wherein a chromic member, whose color changes depending on the status of the target, is partially provided on the external surface of the article so as to correspond to a position of the target, and
    wherein the information acquisition unit is disposed outside the article and acquires the color of the chromic member as one of the physical information directly based on a captured image of the chromic member provided on the external surface without going through a sensor.

2. The status checking device for a built-in object according to claim 1, wherein the one or more pieces of physical information includes a plurality of pieces of physical information,
    wherein the information acquisition unit acquires the plurality of pieces of physical information, and
    wherein the status determination unit determines a status of the target based on the acquired plurality of pieces of physical information.

3. The status checking device for a built-in object according to claim 2, wherein the abnormality determination unit determines whether the target is in the abnormal state based on at least one of a result of a comparison between the acquired plurality of pieces of physical information and abnormality determination threshold values corresponding respectively to said plurality of pieces of physical information and a result of a comparison between a combination of the acquired plurality of pieces of physical information and a combination of abnormality determination threshold values corresponding to said combination of the plurality of pieces of physical information.

4. The status checking device for a built-in object according to claim 2, wherein the status determination unit has a malfunction prediction unit for determining whether the target is in a state where a malfunction is predicted to occur within a predetermined time period.

5. The status checking device for a built-in object according to claim 4, wherein the malfunction prediction unit determines whether the target is in the state where a malfunction is predicted to occur within a predetermined time period based on at least one of a result of a comparison between the acquired plurality of pieces of physical information and malfunction prediction determination threshold values corresponding respectively to said plurality of pieces of physical information and a result of a comparison between a combination of the acquired plurality of pieces of physical information and a combination of malfunction prediction determination threshold values corresponding to said combination of the plurality of pieces of physical information.

6. The status checking device for a built-in object according to claim 1, wherein the status determination unit has a malfunction prediction unit for determining whether the target is in the state where a malfunction is predicted to occur within a predetermined time period based on a status determination model generated from history information, the history information being a result of determining a status of the target based on the acquired one or more pieces of physical information.

7. The status checking device for a built-in object according to claim 6, wherein the status determination model is composed of two models, the two models being a malfunction state model generated from the history information as obtained when a malfunction has occurred in the target and a normal state model generated from the history information as obtained when a malfunction has not occurred in the target, and
    wherein, when the target is in a state more analogous to the malfunction state model than to the normal state model, the malfunction prediction unit determines that the target is in the state where a malfunction is predicted to occur within a predetermined time period.

8. The status checking device for a built-in object according to claim 1, wherein the one or more pieces of physical information regarding the surface of the article includes at least one of properties of the surface of the article including a temperature, a position, a strain, a displacement, a vibration, a hue, a brightness, a saturation, a moisture content, an oil content, and a reflectance of a sound wave, ultrasound, infrared light, or any other type of light.

9. The status checking device for a built-in object according to claim 1, wherein the one or more pieces of physical information include at least one of a sound, an odor, ultrasound, an electromagnetic wave, radiation, and an emission, which are detected outside the article.

10. The status checking device for a built-in object according to claim 1, wherein the information acquisition unit acquires the one or more pieces of physical information based on a captured image of at least a part of the surface of the article.

11. The status checking device for a built-in object according to claim 10, wherein the chromic member includes a thermochromic member whose color changes depending on a temperature on the surface of the article, and
wherein the information acquisition unit acquires the temperature of the surface of the article based on a captured image of the thermochromic member.

12. The status checking device for a built-in object according to claim 10, wherein the information acquisition unit has an enlarged image capturing function of capturing an enlarged image of at least a part of the surface of the article.

13. The status checking device for a built-in object according to claim 11, further comprising a drive unit for driving the information acquisition unit to change an image capturing range.

14. The status checking device for a built-in object according to claim 11, wherein the information acquisition unit has a plurality of cameras for capturing images of different areas on the surface of the article.

15. The status checking device for a built-in object according to claim 14, wherein the plurality of cameras are disposed so as to surround the article.

16. The status checking device for a built-in object according to claim 11, wherein the information acquisition unit has:
a drone equipped with a camera; and
a drone control unit for capturing an image of the surface of the article with the camera.

17. The status checking device for a built-in object according to claim 11, wherein the information acquisition unit has an optical system configured for wide- angle or omnidirectional image capturing.

18. The status checking device for a built-in object according to claim 11, wherein the information acquisition unit acquires a three-dimensional shape of at least a part of the surface of the article based on the captured image, and acquires the one or more pieces of physical information based on the acquired three-dimensional shape.

19. The status checking device for a built-in object according to claim 11, wherein the information acquisition unit is disposed away from the surface of the article and disposed at least above the article.

20. The status checking device for a built-in object according to claim 1, wherein, by using a status of the article at a time of construction or installation as a criterion, the status determination unit determines whether or not the target is in an abnormal state or a state where a malfunction is predicted to occur within a predetermined time period.

21. The status checking device for a built-in object according to claim 1, wherein the article is to be operated, and
wherein, by using a status of the article at a start of the operation as a criterion, the status determination unit determines whether or not the target is in an abnormal state or a state where a malfunction is predicted to occur within a predetermined time period.

22. The status checking device for a built-in object according to claim 1, wherein in a case where a first piece of physical information agrees with a second piece of physical information, the first piece of physical information being acquired previously as a piece of physical information obtained when the target is in an abnormal state or a state where a malfunction is predicted to occur within a predetermined time period, the second piece of physical information being acquired at any time by the information acquisition unit, the status determination unit determines that the target is in the abnormal state or the state where a malfunction is predicted to occur within a predetermined time period.

23. The status checking device for a built-in object according to claim 1, wherein the article is an industrial robot having at least one rotation shaft,
wherein the target is a speed reducer that is built in the at least one rotation shaft, and
wherein the information acquisition unit acquires the one or more pieces of physical information regarding a surface of the at least one rotation shaft.

24. An operation checking device for checking, in a virtual space on a computer, an operation of an article including a target built therein, a status of the target being unable to be directly checked from outside,
wherein a status of the target built in the article acquired by the status checking device for a built-in object according to claim 1 is inputted, via an input device, as information related to a status of the article.

25. A method for checking a status of a built-in object, comprising steps of:
acquiring, with an information acquisition unit, at least one piece of physical information regarding an article including a target built therein as part of the article,
wherein the article includes a housing and the target is at least partially disposed within the housing such that a status of the target is unable to be directly checked from outside of the housing of the article,
wherein the at least one piece of physical information is manifested on an external surface of the article,
the at least one piece of physical information regarding the article being acquired from the surface of the article without having the information acquisition unit in contact with the surface of the article;
determining whether or not the target built in as part of the article is in an abnormal state or a state where a malfunction is predicted to occur within a predetermined time period based on the acquired at least one piece of physical information regarding the article;
wherein a chromic member, whose color changes depending on the status of the target, is partially provided on the external surface of the article so as to correspond to a position of the target,
wherein the information acquisition unit is disposed outside the article and acquires the color of the chromic member as one of the physical information directly based on a captured image of the chromic member provided on the external surface without going through a sensor.

26. The status checking device for a built-in object according to claim 1, wherein the target is completely disposed within the housing such that the status of the target is unable to be directly checked from outside of the housing of the article.

27. The status checking device for a built-in object according to claim 1, wherein a part of the target is exposed to outside of the housing of the article but the status of the target is unable to be directly checked from outside of the housing of the article.

28. The status checking device for a built-in object according to claim 1, wherein the status of the target is determined without requiring a dedicated sensor for directly detecting the status of the target provided inside the housing of the article.

29. The status checking device for a built-in object according to claim 1, wherein the status of the target is determined without directly providing a sensor in the target built in the article.

30. A status checking device for a built-in object, comprising:
- an information acquisition unit for acquiring one or more pieces of physical information regarding an article including a target built therein, a status of the target being unable to be directly checked from outside, the one or more pieces of physical information being manifested on an external surface of the article,
- the information acquisition unit acquiring the one or more pieces of physical information regarding the article from the surface of the article without contacting the surface of the article,
- the information acquisition unit comprising a camera and a non-contact-type information acquisition unit other than the camera,
- the non-contact-type information acquisition unit comprising at least one of a radiation thermometer for measuring a temperature, a laser-type or an eddy current-type distance/displacement sensor for measuring a position and/or a displacement, a laser Doppler-type non-contact vibrometer for measuring a vibration, a sensor using a microwave to measure a moisture amount, a sensor using a laser to measure an oil amount, a microphone that measures a sound, a radiation measuring instrument that measures radiation, an electromagnetic wave measuring instrument that measures an electromagnetic wave, an ultrasound measuring instrument that measures ultrasound, a gas measuring instrument that measures a gas, a TOF (Time of Flight) sensor that measures a distance to a subject, a strain calculator that calculates a strain of the external surface of the article based on a captured image of a random pattern, a grid pattern, and/or a dot pattern projected by a projector onto the external surface of the article, a radar that acquires an electromagnetic wave absorption rate, a microphone that acquires a sound, an odor sensor that acquires an odor, a radiation detector that detects, with a sensor, radiation transmitted through the article and calculates an absorption rate of radiation absorbed by the article based on an amount of the radiation thus detected, and an ultrasound detector that detects, with a sensor, ultrasound transmitted through the article and calculates an absorption rate of ultrasound absorbed by the article based on an amount of the ultrasound thus detected; and
- a status determination unit for determining the status of the target based on the acquired one or more pieces of physical information.

* * * * *